United States Patent
Procter et al.

(10) Patent No.: US 12,361,671 B2
(45) Date of Patent: Jul. 15, 2025

(54) METHODS AND SYSTEMS FOR ACCURATE VISUAL LAYER SEPARATION IN THE DISPLAYS OF SCANNING SYSTEMS

(71) Applicant: Rapiscan Systems, Inc., Torrance, CA (US)

(72) Inventors: Mark Procter, Wilmslow (GB); James Ollier, Huyton (GB)

(73) Assignee: Rapiscan Systems, Inc., Torrance, CA (US)

( * ) Notice: Subject to any disclaimer, the term of this patent is extended or adjusted under 35 U.S.C. 154(b) by 385 days.

(21) Appl. No.: 17/808,726

(22) Filed: Jun. 24, 2022

(65) Prior Publication Data

US 2023/0076255 A1    Mar. 9, 2023

Related U.S. Application Data

(60) Provisional application No. 63/260,951, filed on Sep. 7, 2021.

(51) Int. Cl.
| | |
|---|---|
| *G06K 9/00* | (2022.01) |
| *G06T 7/11* | (2017.01) |
| *G06V 10/50* | (2022.01) |

(52) U.S. Cl.
CPC .............. *G06V 10/507* (2022.01); *G06T 7/11* (2017.01); *G06T 2207/10116* (2013.01); *G06T 2207/20216* (2013.01)

(58) Field of Classification Search
CPC . G06T 2207/10116; G06T 2207/30112; G06T 7/11; G06T 2207/20216;

(Continued)

(56) References Cited

U.S. PATENT DOCUMENTS

| 4,472,822 A | 9/1984 | Swift |
| 5,642,394 A | 6/1997 | Rothschild |

(Continued)

FOREIGN PATENT DOCUMENTS

| CN | 103327901 | 9/2013 |
| WO | 1998002763 A1 | 1/1998 |

(Continued)

OTHER PUBLICATIONS

International Search Report for PCT/US22/73142, Sep. 12, 2022.

(Continued)

*Primary Examiner* — Gregory A Morse
*Assistant Examiner* — Kevin M Coomber
(74) *Attorney, Agent, or Firm* — Novel IP

(57) ABSTRACT

The present specification relates to a method for enabling an operator to perform visual layer separation, the method including: retrieving at least one X-ray scan image from a memory in data communication with an inspection system, wherein the image comprises a first area of pixels representative of a target object obscured by a clutter object and a second area of pixels representative of the clutter object; receiving a selection of the pixels representative of the first area; receiving a selection of the pixels representative of the second area; determining if the selected second area meets a predefined quality threshold; if the selected second area meets the predefined quality threshold, generating a modified at least one X-ray image; and if the selected second area does not meet the predefined quality threshold, prompting the operator to select a different second area of pixels representative of the clutter object.

22 Claims, 17 Drawing Sheets

(58) Field of Classification Search
CPC ... G06T 5/94; G06T 2207/20104; G06T 5/50; G06T 7/0004; G01N 2223/423; G01N 23/203; G01N 23/041; G01N 23/046; G01N 23/10; G01N 23/04; G01N 2223/643; G01V 5/224; G01V 5/0041; G01V 5/005; G01V 5/222; G01V 5/22; G01V 5/20; G01V 5/281; G01V 5/234; G06V 10/507
See application file for complete search history.

(56) References Cited

U.S. PATENT DOCUMENTS

| | | | |
|---|---|---|---|
| 5,838,758 A | 11/1998 | Krug | |
| 6,236,709 B1 | 5/2001 | Perry | |
| 6,928,137 B2 | 8/2005 | Bruder | |
| 7,177,391 B2 | 2/2007 | Chapin | |
| 7,261,466 B2 | 8/2007 | Bhatt | |
| 7,349,525 B2 | 3/2008 | Morton | |
| 7,354,197 B2 | 4/2008 | Bhatt | |
| 7,376,218 B2 | 5/2008 | Chapin | |
| 7,440,543 B2 | 10/2008 | Morton | |
| 7,453,987 B1 | 11/2008 | Richardson | |
| 7,490,984 B2 | 2/2009 | Bhatt | |
| 7,505,563 B2 | 3/2009 | Morton | |
| 7,510,324 B2 | 3/2009 | Bhatt | |
| 7,512,215 B2 | 3/2009 | Morton | |
| 7,551,714 B2 | 6/2009 | Rothschild | |
| 7,551,718 B2 | 6/2009 | Rothschild | |
| 7,555,099 B2 | 6/2009 | Rothschild | |
| 7,564,939 B2 | 7/2009 | Morton | |
| 7,664,230 B2 | 2/2010 | Morton | |
| 7,684,538 B2 | 3/2010 | Morton | |
| 7,724,868 B2 | 5/2010 | Morton | |
| 7,864,920 B2 | 1/2011 | Rothschild | |
| 7,876,879 B2 | 1/2011 | Morton | |
| 7,903,789 B2 | 3/2011 | Morton | |
| 7,924,979 B2 | 4/2011 | Rothschild | |
| 7,929,663 B2 | 4/2011 | Morton | |
| 7,949,101 B2 | 5/2011 | Morton | |
| 7,995,707 B2 | 8/2011 | Rothschild | |
| 8,039,812 B1 | 10/2011 | Crocker | |
| 8,085,897 B2 | 12/2011 | Morton | |
| 8,094,784 B2 | 1/2012 | Morton | |
| 8,135,110 B2 | 3/2012 | Morton | |
| 8,204,173 B2 | 6/2012 | Betcke | |
| 8,223,919 B2 | 7/2012 | Morton | |
| 8,243,876 B2 | 8/2012 | Morton | |
| 8,311,313 B1 | 11/2012 | Gamble | |
| 8,331,535 B2 | 12/2012 | Morton | |
| 8,451,974 B2 | 5/2013 | Morton | |
| 8,552,722 B2 | 10/2013 | Lionheart | |
| 8,559,592 B2 | 10/2013 | Betcke | |
| 8,625,735 B2 | 1/2014 | Morton | |
| 8,804,899 B2 | 8/2014 | Morton | |
| 8,824,637 B2 | 9/2014 | Morton | |
| 8,837,669 B2 | 9/2014 | Morton | |
| 8,842,808 B2 | 9/2014 | Rothschild | |
| 8,885,794 B2 | 11/2014 | Morton | |
| 8,958,526 B2 | 2/2015 | Morton | |
| 8,971,484 B2 | 3/2015 | Beckmann | |
| 9,001,973 B2 | 4/2015 | Morton | |
| 9,020,095 B2 | 4/2015 | Morton | |
| 9,046,465 B2 | 6/2015 | Thompson | |
| 9,048,061 B2 | 6/2015 | Morton | |
| 9,086,497 B2 | 7/2015 | Bendahan | |
| 9,093,187 B1 | 7/2015 | Johnson | |
| 9,093,245 B2 | 7/2015 | Morton | |
| 9,113,839 B2 | 8/2015 | Morton | |
| 9,158,030 B2 | 10/2015 | Morton | |
| 9,183,647 B2 | 11/2015 | Morton | |
| 9,189,846 B2 | 11/2015 | Wismüller | |
| 9,208,988 B2 | 12/2015 | Morton | |
| 9,263,225 B2 | 2/2016 | Morton | |
| 9,420,677 B2 | 8/2016 | Morton | |
| 9,442,082 B2 | 9/2016 | Morton | |
| 9,442,213 B2 | 9/2016 | Bendahan | |
| 9,562,866 B2 | 2/2017 | Morton | |
| 9,576,766 B2 | 2/2017 | Morton | |
| 9,606,259 B2 | 3/2017 | Morton | |
| 9,618,648 B2 | 4/2017 | Morton | |
| 9,638,646 B2 | 5/2017 | Morton | |
| 9,675,306 B2 | 6/2017 | Morton | |
| 9,714,920 B2 | 7/2017 | Lionheart | |
| 9,726,619 B2 | 8/2017 | Thompson | |
| 9,747,705 B2 | 8/2017 | Morton | |
| 9,996,890 B1 | 6/2018 | Cinnamon | |
| 10,089,956 B2 * | 10/2018 | Awad | G06T 5/92 |
| 10,107,783 B2 | 10/2018 | Lionheart | |
| 10,175,381 B2 | 1/2019 | Morton | |
| 10,295,483 B2 | 5/2019 | Morton | |
| 10,504,261 B2 | 12/2019 | Cinnamon | |
| 10,593,099 B2 | 3/2020 | Sudarsky | |
| 11,594,001 B2 | 2/2023 | Sivakumar | |
| 2001/0022830 A1 | 9/2001 | Sommer | |
| 2006/0098866 A1 | 5/2006 | Whitson | |
| 2007/0189444 A1 * | 8/2007 | Van Steven-Daal | G06T 11/005 378/6 |
| 2008/0118022 A1 | 5/2008 | Hagiwara | |
| 2008/0304622 A1 * | 12/2008 | Morton | G06T 7/12 378/57 |
| 2009/0003514 A1 | 1/2009 | Edic | |
| 2009/0010386 A1 | 1/2009 | Peschmann | |
| 2009/0034790 A1 | 2/2009 | Song | |
| 2009/0175411 A1 | 7/2009 | Gudmundson | |
| 2009/0213989 A1 † | 8/2009 | Harding | |
| 2009/0221881 A1 | 9/2009 | Qian | |
| 2009/0274277 A1 | 11/2009 | Morton | |
| 2009/0316855 A1 | 12/2009 | Morton | |
| 2010/0086185 A1 | 4/2010 | Weiss | |
| 2010/0172476 A1 | 7/2010 | Morton | |
| 2010/0223016 A1 | 9/2010 | Gibson | |
| 2010/0284509 A1 † | 11/2010 | Oreper | |
| 2010/0290691 A1 * | 11/2010 | Eilbert | G01V 5/223 382/132 |
| 2012/0081386 A1 | 4/2012 | Wiemker | |
| 2012/0140879 A1 | 6/2012 | Gudmundson | |
| 2012/0219116 A1 | 8/2012 | Thompson | |
| 2013/0170611 A1 | 7/2013 | Beckmann | |
| 2013/0251098 A1 | 9/2013 | Morton | |
| 2013/0264483 A1 | 10/2013 | Abenaim | |
| 2013/0336447 A1 | 12/2013 | Morton | |
| 2014/0023181 A1 | 1/2014 | Noshi | |
| 2014/0105497 A1 | 4/2014 | Zadeh | |
| 2014/0211916 A1 | 7/2014 | Morton | |
| 2014/0294147 A1 † | 10/2014 | Chen | |
| 2014/0342631 A1 | 11/2014 | Morton | |
| 2014/0369568 A1 * | 12/2014 | Mangoubi | G06T 7/41 382/108 |
| 2015/0139491 A1 * | 5/2015 | Simanovsky | G01N 23/046 382/103 |
| 2015/0357148 A1 | 12/2015 | Morton | |
| 2016/0025888 A1 | 1/2016 | Peschmann | |
| 2016/0048984 A1 | 2/2016 | Frigo | |
| 2016/0055650 A1 | 2/2016 | Park | |
| 2016/0343533 A1 | 11/2016 | Morton | |
| 2017/0161922 A1 | 6/2017 | Morton | |
| 2017/0215814 A1 | 8/2017 | Cales | |
| 2017/0238887 A1 * | 8/2017 | Karim | G01T 1/24 |
| 2017/0371010 A1 | 12/2017 | Shanbhag | |
| 2018/0038988 A1 | 2/2018 | Morton | |
| 2018/0128754 A1 | 5/2018 | Thompson | |
| 2019/0178821 A1 | 6/2019 | Morton | |
| 2019/0323946 A1 | 10/2019 | Myers | |
| 2020/0337658 A1 | 10/2020 | Sjöstrand | |
| 2022/0323030 A1 | 10/2022 | Manalad | |
| 2023/0128795 A1 * | 4/2023 | Onishi | G01N 23/04 378/62 |

(56) References Cited

U.S. PATENT DOCUMENTS

FOREIGN PATENT DOCUMENTS

| WO | 2008024825 A2 | 2/2008 |
| WO | 2008157843 | 12/2008 |
| WO | 2021051191 A1 | 3/2021 |

OTHER PUBLICATIONS

Keevil, S.V., Lawinski, C.P. and Morton, E.J., 1987, "Measurement of the performance characteristics of anti-scatter grids.", Phys. Med. Biol., 32(3), 397-403.

Morton, E.J., Webb, S., Bateman, J.E., Clarke, L.J. and Shelton, C.G., 1990, "Three-dimensional x-ray micro-tomography for medical and biological applications.", Phys. Med. Biol., 35(7), 805-820.

Morton, E.J., Swindell, W., Lewis, D.G. and Evans, P.M., 1991, "A linear array scintillation-crystal photodiode detector for megavoltage imaging.", Med. Phys., 18(4), 681-691.

Morton, E.J., Lewis, D.G. and Swindell, W., 1988, "A method for the assessment of radiotherapy treatment precision", Brit. J. Radiol., Supplement 22, 25.

Swindell, W., Morton, E.J., Evans, P.M. and Lewis, D.G., 1991, "The design of megavoltage projection imaging systems: some theoretical aspects.", Med. Phys., 18(5), 855-866.

Morton, E.J., Evans, P.M., Ferraro, M., Young, E.F. and Swindell, W., 1991, "A video frame store facility for an external beam radiotherapy treatment simulator.", Brit. J. Radiol., 64, 747-750.

Antonuk, L.E., Yorkston, J., Kim, C.W., Huang, W., Morton, E.J., Longo, M.J. and Street, R.A., 1991, "Light response characteristics of amorphous silicon arrays for megavoltage and diagnostic imaging.", Mat. Res. Soc. Sym. Proc., 219, 531-536.

Yorkston, J., Antonuk, L.E., Morton, E.J., Boudry, J., Huang, W., Kim, C.W., Longo, M.J. and Street, R.A., 1991, "The dynamic response of hydrogenated amorphous silicon imaging pixels.", Mat. Res. Soc. Sym. Proc., 219, 173-178.

Evans, P.M., Gildersleve, J.Q., Morton, E.J., Swindell, W., Coles, R., Ferraro, M., Rawlings, C., Xiao, Z.R. and Dyer, J., 1992, "Image comparison techniques for use with megavoltage imaging systems.", Brit. J. Radiol., 65, 701-709.

Morton, E.J., Webb, S., Bateman, J.E., Clarke, L.J. and Shelton, C.G., 1989, "The development of 3D x-ray micro-tomography at sub 100Å?Aμm resolution with medical, industrial and biological applications.", Presentation at IEE colloquium "Medical scanning and imaging techniques of value in non-destructive testing", London, Nov. 3, 1989.

Antonuk, L.E., Boudry, J., Huang, W., McShan, D.L., Morton, E.J., Yorkston, J, Longo, M.J. and Street, R.A., 1992, "Demonstration of megavoltage and diagnostic x-ray imaging with hydrogenated amorphous silicon arrays.", Med. Phys., 19(6), 1455-1466.

Gildersleve, J.Q., Swindell, W., Evans, P.M., Morton, E.J., Rawlings, C. and Dearnaley, D.P., 1991, "Verification of patient positioning during radiotherapy using an integrated megavoltage imaging system.", in "Tumour Response Monitoring and Treatment Planning", Proceedings of the International Symposium of the W. Vaillant Foundation on Advanced Radiation Therapy, Munich, Germany, Ed A. Breit (Berlin: Springer), 693-695.

Lewis, D.G., Evans, P.M., Morton, E.J., Swindell, W. and Xiao, X.R., 1992, "A megavoltage CT scanner for radiotherapy verification.", Phys. Med. Biol., 37, 1985-1999.

Antonuk, L.E., Boudry, J., Kim, C.W., Longo, M.J., Morton, E.J., Yorkston, J. and Street, R.A., 1991, "Signal, noise and readout considerations in the development of amorphous silicon photodiode arrays for radiotherapy and diagnostic x-ray imaging.", SPIE vol. 1443 Medical Imaging V: Image Physics, 108-119.

Antonuk, L.E., Yorkston, J., Huang, W., Boudry, J., Morton, E.J., Longo, M.J. and Street, R.A., 1992, "Radiation response characteristics of amorphous silicon arrays for megavoltage radiotherapy imaging.", IEEE Trans. Nucl. Sci., 39,1069-1073.

Antonuk, L.E., Yorkston, J., Huang, W., Boudry, J., Morton, E.J., Longo, M.J. and Street, R.A., 1992, "Factors affecting image quality for megavoltage and diagnostic x-ray a-Si:H imaging arrays.", Mat. Res. Soc. Sym. Proc., 258, 1069-1074.

Antonuk, L.E., Boudry, J., Yorkston, J., Morton, E.J., Huang, W. and Street, R.A., 1992, "Development of thin-film, flat-panel arrays for diagnostic and radiotherapy imaging.", SPIE vol. 1651, Medical Imaging VI: Instrumentation, 94-105.

Yorkston, J., Antonuk, L.E., Seraji, N., Boudry, J., Huang, W., Morton, E.J., and Street, R.A., 1992, "Comparison of computer simulations with measurements from a-Si:H imaging arrays.", Mat. Res. Soc. Sym. Proc., 258, 1163-1168.

Morton, E.J., Antonuk, L.E., Berry, J.E., Boudry, J., Huang, W., Mody, P., Yorkston, J. and Longo, M.J., 1992, "A CAMAC based data acquisition system for flat-panel image array readout", Presentation at IEEE Nuclear Science Symposium, Orlando, Oct. 25-31, 1992.

Antonuk, L.E., Yorkston, J., Huang, W., Boudry, J., Morton, E.J. and Street, R.A., 1993, "Large area, flat-panel a-Si:H arrays for x-ray imaging.", SPIE vol. 1896, Medical Imaging 1993: Physics of Medical Imaging, 18-29.

Morton, E.J., Antonuk, L.E., Berry, J.E., Huang, W., Mody, P. and Yorkston, J., 1994, "A data acquisition system for flat-panel imaging arrays", IEEE Trans. Nucl. Sci., 41(4), 1150-1154.

Antonuk, L.E., Boudry, J., Huang, W., Lam, K.L., Morton, E.J., TenHaken, R.K., Yorkston, J. and Clinthorne, N.H., 1994, "Thin-film, flat-panel, composite imagers for projection and tomographic imaging", IEEE Trans. Med. Im., 13(3), 482-490.

Gildersleve, J., Dearnaley, D., Evans, P., Morton, E.J. and Swindell, W., 1994, "Preliminary clinical performance of a scanning detector for rapid portal imaging", Clin. Oncol., 6, 245-250.

Hess, R., De Antonis, P., Morton, E.J. and Gilboy, W.B., 1994, "Analysis of the pulse shapes obtained from single crystal CdZnTe radiation detectors", Nucl. Inst. Meth., A353, 76-79.

DeAntonis, P., Morton, E.J., T. Menezes, 1996, "Measuring the bulk resistivity of CdZnTe single crystal detectors using a contactless alternating electric field method", Nucl. Inst. Meth., A380, 157-159.

DeAntonis, P., Morton, E.J., Podd, F., 1996, "Infra-red microscopy of CdZnTe radiation detectors revealing their internal electric field structure under bias", IEEE Trans. Nucl. Sci., 43(3), 1487-1490.

Tavora, L.M.N., Morgado, R.E., Estep, R.J., Rawool-Sullivan, M., Gilboy, W.B. and Morton, E.J., 1998, "One-sided imaging of large, dense, objects using the 511 keV photons from induced pair production", IEEE Trans. Nucl. Sci., 45(3), 970-975.

Morton, E.J., 1995, "Archaeological potential of computerised tomography", Presentation at IEE Colloquium on "NDT in archaeology and art", London, May 25, 1995.

Tavora, L.M.N. and Morton, E.J., 1998, "Photon production using a low energy electron expansion of the EGS4 code system", Nucl. Inst. Meth., B143, 253-271.

Patel, D.C. and Morton, E.J., 1998, "Analysis of improved adiabatic pseudo-domino logic family", Electron. Lett., 34(19), 1829-1830.

Kundu, A. and Morton, E.J., 1999, "Numerical simulation of argon-methane gas filled proportional counters", Nucl. Inst. Meth., A422, 286-290.

Luggar, R.D., Key, M.J., Morton, E.J. and Gilboy, W.B., 1999, "Energy dispersive X-ray scatter for measurement of oil/water ratios", Nucl. Inst. Meth., A422, 938-941.

Morton, E.J., Crockett, G.M., Sellin, P.J. and DeAntonis, P., 1999, "The charged particle response of CdZnTe radiation detectors", Nucl. Inst. Meth., A422, 169-172.

Morton, E.J., Clark, R.J. and Crowley, C., 1999, "Factors affecting the spectral resolution of scintillation detectors", Nucl. Inst. Meth., A422, 155-158.

Morton, E.J., Caunt, J.C., Schoop, K., Swinhoe, M., 1996, "A new handheld nuclear material analyser for safeguards purposes", Presentation at INMM annual meeting, Naples, Florida, Jul. 1996.

Hepworth, S., McJury, M., Oldham, M., Morton, E.J. and Doran, S.J., 1999, "Dose mapping of inhomogeneities positioned in radiosensitive polymer gels", Nucl. Inst. Meth., A422, 756-760.

(56) References Cited

OTHER PUBLICATIONS

Morton, E.J., Luggar, R.D., Key, M.J., Kundu, A., Tavora, L.M.N. and Gilboy, W.B., 1999, "Development of a high speed X-ray tomography system for multiphase flow imaging", IEEE Trans. Nucl. Sci., 46 III(1), 380-384.

Tavora, L.M.N., Morton, E.J., Santos, F.P. and Dias, T.H.V.T., 2000, "Simulation of X-ray tubes for imaging applications", IEEE Trans. Nucl. Sci., 47, 1493-1497.

Tavora, L.M.N., Morton, E.J. and Gilboy, W.B., 2000, "Design considerations for transmission X-ray tubes operated at diagnostic energies", J. Phys. D: Applied Physics, 33(19), 2497-2507.

Morton, E.J., Hossain, M.A., DeAntonis, P. and Ede, A.M.D., 2001, "Investigation of Au—CdZnTe contacts using photovoltaic measurements", Nucl. Inst. Meth., A458, 558-562.

Ede, A.M.D., Morton, E.J. and DeAntonis, P., 2001, "Thin-film CdTe for imaging detector applications", Nucl. Inst. Meth., A458, 7-11.

Tavora, L.M.N., Morton, E.J. and Gilboy, W.B., 2001, "Enhancing the ratio of fluorescence to bremsstrahlung radiation in X-ray tube spectra", App. Rad. and Isotopes, 54(1), 59-72.

Menezes, T. and Morton, E.J., 2001, "A preamplifier with digital output for semiconductor detectors", Nucl. Inst. Meth. A., A459, 303-318.

Johnson, D.R., Kyriou, J., Morton, E.J., Clifton, A.C. Fitzgerald, M. and MacSweeney, J.E., 2001, "Radiation protection in interventional radiology", Clin. Rad., 56(2), 99-106.

Tavora, L.M.N., Gilboy, W.B. and Morton, E.J., 2001, "Monte Carlo studies of a novel X-ray tube anode design", Rad. Phys. and Chem., 61, 527-529.

"Morton, E.J., 1998, "Is film dead: the flat plate revolution", Keynote Talk, IPEM Annual Conference, Brighton, Sep. 14-17, 1998"\.

Luggar, R.D., Morton, E.J., Jenneson, P.M. and Key, M.J., 2001, "X-ray tomographic imaging in industrial process control", Rad. Phys. Chem., 61, 785-787.

Luggar, R.D., Morton, E.J., Key, M.J., Jenneson, P.M. and Gilboy, W.B., 1999, "An electronically gated multi-emitter X-ray source for high speed tomography", Presentation at SPIE Annual Meeting, Denver, Jul. 19-23, 1999.

Gregory, P.J., Hutchinson, D.J., Read, D.B., Jenneson, P.M., Gilboy, W.B. and Morton, E.J., 2001, "Non-invasive imaging of roots with high resolution X-ray microtomography", Plant and Soil, 255(1), 351-359.

Kundu, A., Morton, E.J., Key, M.J. and Luggar, R.D., 1999, "Monte Carlo simulations of microgap gas-filled proportional counters", Presentation at SPIE Annual Meeting, Denver, Jul. 19-23, 1999.

Hossain, M.A., Morton, E.J., and Ozsan, M.E., 2002, "Photoelectronic investigation of CdZnTe spectral detectors", IEEE Trans. Nucl. Sci, 49(4), 1960-1964.

Panman, A., Morton, E.J., Kundu, A and Sellin, P.J., 1999, "Optical Monte Carlo transport in scintillators", Presentation at SPIE Annual Meeting, Denver, Jul. 19-23, 1999.

Jenneson, P.M., Gilboy, W.B., Morton, E.J., and Gregory, P.J., 2003, "An X-ray micro-tomography system optimised for low dose study of living organisms", App. Rad. Isotopes, 58, 177-181.

Key, M.J., Morton, E.J., Luggar, R.D. and Kundu, A., 2003, "Gas microstrip detectors for X-ray tomographic flow imaging", Nucl. Inst. Meth., A496, 504-508.

Jenneson, P.M., Luggar, R.D., Morton, E.J., Gundogdu, O, and Tuzun, U, 2004, "Examining nanoparticle assemblies using high spatial resolution X-ray microtomography", J. App. Phys, 96(5), 2889-2894.

Tavora, L.M., Gilboy, W.B. and Morton, E.J., 2000, "Influence of backscattered electrons on X-ray tube output", Presentation at SPIE Annual Meeting, San Diego, Jul. 30-Aug. 3, 2000.

Wadeson, N., Morton, E.J., and Lionheart, W.B., 2010, "Scatter in an uncollimated x-ray CT machine based on a Geant4 Monte Carlo simulation", SPIE Medical Imaging 2010: Physics of Medical Imaging, Feb. 15-18, 2010, San Diego, USA.

Morton, E.J., 2010, "Position sensitive detectors in security: Users perspective", Invited talk, STFC meeting on position sensitive detectors, RAL, May 2010.

International Search Report for PCT/US18/27872, Jul. 23, 2018.

Third Party Submission Under 37 CFR 1.290 for U.S. Appl. No. 15/954,853, filed Apr. 19, 2019.

Domingo Mery, "Computer Vision for X-Ray Testing: Imaging, Systems, Image Databases, and Algorithms", Springer International Publishing Switzerland 2015 (Year: 2015).

K. Wells; D.A. Bradley;, "A review of X-ray explosives detection techniques for checked baggage", Applied Radiation and Isotopes., Elsevier, Oxford., GB, GB, (Jan. 12, 2012), vol. 70, No. 8, doi:10.1016/j.apradiso.2012.01.011, ISSN 0969-8043, pp. 1729-1746, XP028401820.

Richard D. R. Macdonald, "<title>Design and implementation of a dual-energy x-ray imaging system for organic material detection in an airport security application</title>", Proceedings of SPIE, SPIE, (Apr. 4, 2001), vol. 4301, doi:10.1117/12.420922, ISSN 0277786X, pp. 31-41, XP055104503.

International Search Report for corresponding International Patent Application No. PCT/CA2014/050981 dated Jan. 5, 2015, 6 pgs.

\* cited by examiner
† cited by third party

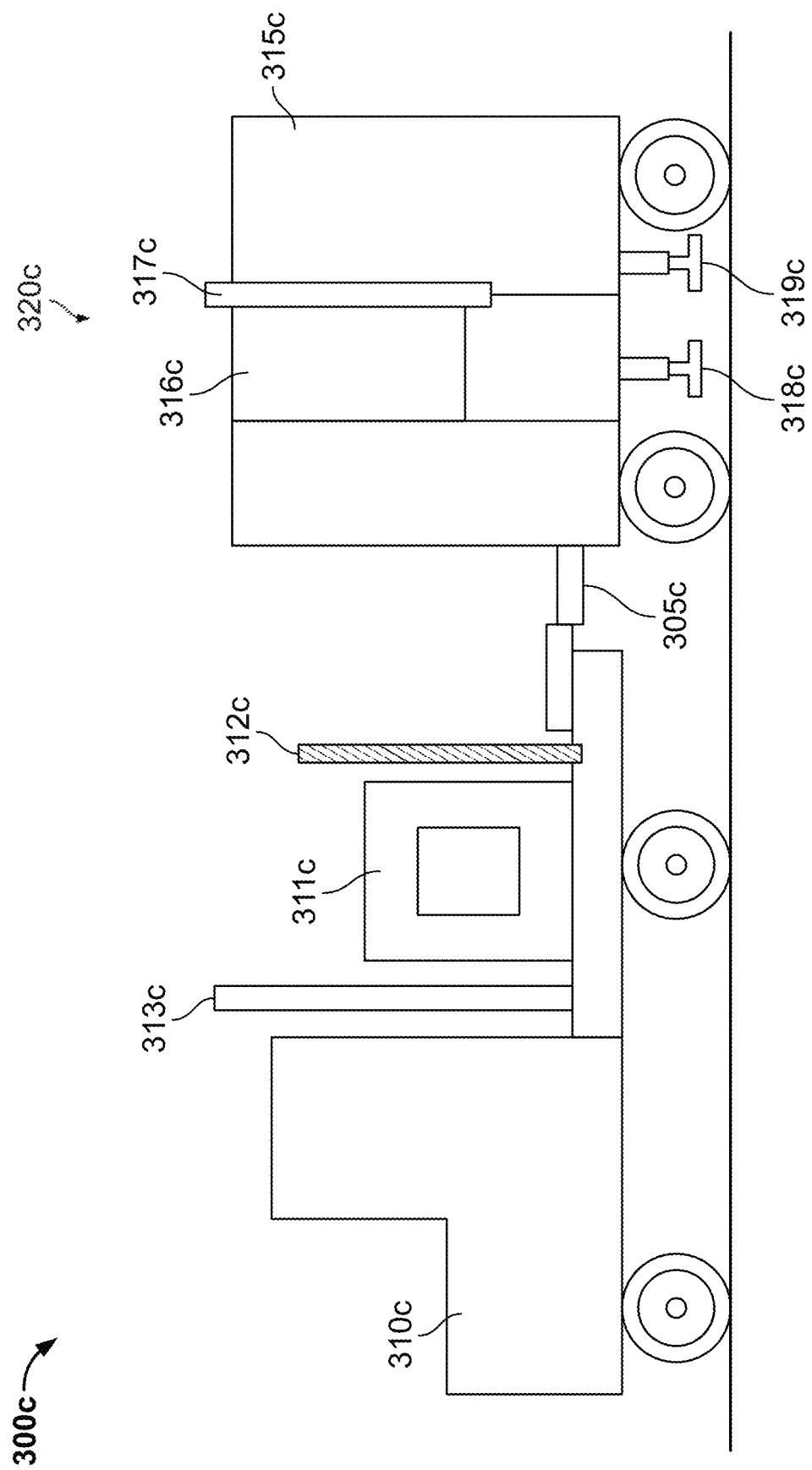

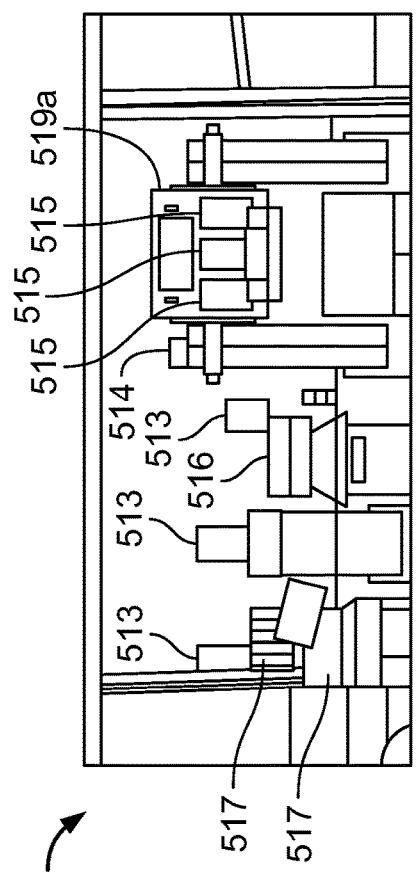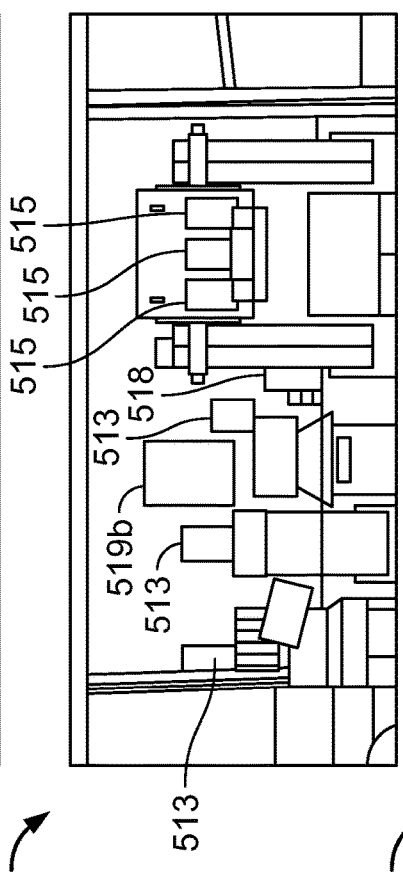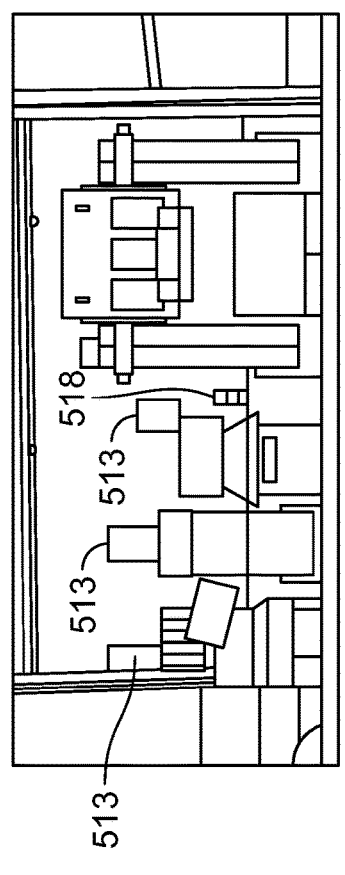

METHODS AND SYSTEMS FOR ACCURATE VISUAL LAYER SEPARATION IN THE DISPLAYS OF SCANNING SYSTEMS

CROSS-REFERENCE

The present application relies on U.S. Patent Provisional Application No. 63/260,951, entitled "Methods and Systems for Accurate Visual Layer Separation in the Displays of Scanning Systems" and filed on Sep. 7, 2021, for priority. The above referenced application is herein incorporated by reference in its entirety.

FIELD

The present specification relates to image analyzing methods and systems. More specifically, the present specification relates to methods and systems for identifying the material composition of objects displayed in an image through improved visual layer separation and display processing.

BACKGROUND

Cargo, baggage and parcels need to be inspected at ports, aviation security checkpoints and other points of entry or transportation to assess the quantity of contents, quality of contents, and any possible anomalies that may be associated with the contents of containers, baggage and parcels including contraband such as explosives, narcotics, currency, chemical and nuclear weapons.

Images produced by conventional X-ray systems are often difficult to interpret because objects are superimposed—that is, a threat item may be concealed or obscured by clutter. Therefore, a trained operator must study and interpret each image to render an opinion on whether or not a target of interest, a threat, is present. Operator fatigue and distraction can compromise detection performance, especially when a large number of such radiographs is to be interpreted, such as at high traffic transit points and ports. Even with automated systems, it becomes difficult to comply with the implied requirement to keep the number of false alarms low, when the system is operated at high throughputs.

This difficulty of inspection is magnified when inspecting larger and oftentimes, cluttered pallets, cargo containers, cargo-carrying vehicles, such as tanker trucks, which are uniquely designed to carry fluid/liquids or dry bulk loads as well as parcels and passenger baggage. Current X-ray inspection systems may not provide an accurate indication of the nature of anomalies present in tankers, baggage and parcels. An X-ray image itself is insufficient to discern an amount, type, and quality of a commodity within a tanker, baggage or parcel.

PCT Publication Number WO2014/078547A1 discloses a control circuit having access to at least one high-energy image of a scene assesses that image to identify candidate obfuscators as well as candidate obfuscated objects. This control circuit then processes information regarding the candidate objects to identify objects of interest. These objects of interest are deemed "of interest" as a function of their being obfuscated in a particular context. The reference discloses identifying objects as a function, at least in part, of the material composition of both the object as well as the visual obfuscator and further teaches peeling away background content/attenuation information in order to separate (and facilitate displaying) a given object in relative isolation from that background content.

U.S. Pat. No. 7,286,634 discloses screening articles, such as baggage, utilizing a computerized touch sensitive screen or other computerized pointing device for operator identification and electronic marking of objects within the article to be further examined. Baggage is electromagnetically scanned while traveling on a conveyer and an electronic image is taken of each article and stored in a computer. The disclosed systems utilize a plurality of visual display devices, each with an examiner, which are likely located remotely of the screening operation. Each examination continues independently of the scanning such that there is no interruption in the flow of articles should an examiner detect an object of interest and worthy of further examination, either by screen or by physical examination.

While the prior art does disclose X-ray images with coloring to identify each object separately, it does not teach enabling a user to choose areas in the image in order to separate the objects of interest and materials that are not of interest, referred to as clutter, and to receive feedback about the quality of the areas chosen. Furthermore, while the prior art provides a method to scan the objects like baggage, it does not effectively enable operators to reveal objects that are hidden behind other objects in order to get a clearer image of hidden objects and identify the material composition of the object of interest.

Accordingly, there is a need to develop improved methods and systems for processing images, particularly X-ray images, in order to obtain clearer images of hidden objects. There is also a need for methods and systems that enable the improved display of objects of interest by enabling operators to select cluttered objects, obtain feedback on the choice, and subsequently view obscured objects more clearly.

SUMMARY

The following embodiments and aspects thereof are described and illustrated in conjunction with systems, tools and methods, which are meant to be exemplary and illustrative, not limiting in scope. The present application discloses numerous embodiments.

The present specification contemplates methods and systems for classifying objects in the image according to their material. In some embodiments, the methods of the present specification calculate the intensity of the impact of X-ray on the object to identify its material and display the objects with different colors or other visual indicators depending upon their material.

The present specification discloses a method for enabling an inspection system operator to perform visual layer separation of an image being displayed on a screen in data communication with the inspection system, comprising: retrieving at least one X-ray generated image from a memory in data communication with the inspection system, wherein the image comprises a first area of pixels representative of a target object obscured by a clutter object and a second area of pixels representative of the clutter object, and wherein the second area is different from the first area; receiving a selection of the pixels representative of the first area; receiving a selection of the pixels representative of the second area; determining if the selected second area satisfies a predefined function; if the selected second area satisfies the predefined function, generating a modified at least one X-ray image; and if the selected second area does not meet the predefined function, prompting the operator to select a third area of pixels representative of the clutter object, wherein the third area is different than the first area and the second area.

Optionally, the modified at least one X-ray image is generated by: calculating a first average intensity corresponding to the first area; calculating a second average intensity corresponding to the second area; and modifying the first average intensity using a function of the second average intensity.

Optionally, the determining if the selected second area meets the predefined function is achieved by assessing a uniformity of values associated with the pixels of the second area and if the uniformity of values equals or exceeds a threshold value, determining that the selected second area meets the predefined function.

Optionally, the determining if the selection meets a predefined function is achieved by assessing a uniformity of values associated with the pixels of the second area and if the uniformity of values is less than a threshold value, determining that the selected second area does not meet the predefined function.

The present specification also discloses an inspection system configured to enable an operator to perform visual layer separation of an image being displayed in a screen in data communication with the inspection system, the inspection system being in data communication with a processor that executes a plurality of programmatic instructions or code for: retrieving at least one X-ray generated image from a memory in data communication with the inspection system, wherein the image comprises a first area of pixels representative of a target object obscured by a clutter object and a second area of pixels representative of the clutter object, and wherein the second area is different from the first area; receiving a selection of the pixels representative of the first area; receiving a selection of the pixels representative of the second area; determining if the selected second area meets a predefined value; if the selected second area satisfies the predefined value, generating a modified at least one X-ray image; and if the selected second area does not satisfy the predefined value, prompting the operator to select an area of pixels different from the first area and the second area.

Optionally, the modified at least one X-ray image is generated by: determining a first average intensity corresponding to the first area; determining a second average intensity corresponding to the second area; and modifying the first average intensity using a function of the second average intensity.

Optionally, the determining if the selected second area satisfies the predefined value is achieved by assessing a uniformity of values associated with the pixels of the second area and if the uniformity of values equals or exceeds a predefined value, determining that the selected second area satisfies the predefined value. Optionally, the uniformity of values equals or exceeds the predefined value if a predefined number of individual pixels of the second area are within the predefined deviation from the average value.

Optionally, the determining if the selection meets the predefined value is achieved by assessing a uniformity of values associated with the pixels of the second area and if the uniformity of values is less than a predefined uniformity value, determining that the selected second area does not meet the predefined value. Optionally, the uniformity of values is less than the predefined uniformity value if a predefined number of individual pixels of the second area are outside the predefined deviation from the average value.

In some embodiments, the present specification discloses a method for enabling an inspection system operator to perform visual layer separation of an image being displayed on a screen in data communication with the inspection system, comprising: retrieving at least one X-ray generated image from a memory in data communication with the inspection system, wherein the image comprises a first area of pixels representative of a target object obscured by a clutter object and a second area of pixels representative of the clutter object, and wherein the second area is different from the first area; receiving a selection of the pixels representative of the first area; receiving a selection of the pixels representative of the second area; determining if the selected second area meets a predefined quality threshold; if the selected second area meets the predefined quality threshold, generating a modified at least one X-ray image; and if the selected second area does not meet the predefined quality threshold, prompting the operator, via the screen, to select a different second area of pixels representative of the clutter object.

Optionally, the modified at least one X-ray image is generated by: calculating a first average intensity corresponding to the first area; calculating a second average intensity corresponding to the second area; and stripping away the second average intensity from the first average intensity.

Optionally, the method further comprises normalizing data indicative of the modified at least one X-ray image to account for beam hardening.

Optionally, the determining if the selected second area meets the predefined quality threshold is achieved by assessing a uniformity of values associated with the pixels of the second area and if the uniformity of values equals or exceeds a predefined uniformity threshold value, determining that the selected second area meets the predefined quality threshold.

Optionally, the assessing of the uniformity of values is determined by calculating an average value representative of the pixels of the second area and determining if individual pixels of the second area are within a predefined deviation from the average value.

Optionally, the uniformity of values equals or exceeds the predefined uniformity threshold value if a predefined number of individual pixels of the second area are within the predefined deviation from the average value.

Optionally, the determining if the selection meets a predefined quality threshold is achieved by assessing a uniformity of values associated with the pixels of the second area and if the uniformity of values is less than a predefined uniformity threshold value, determining that the selected second area does not meet the predefined quality threshold.

Optionally, the assessing of the uniformity of values is determined by calculating an average value representative of the pixels of the second area and determining if individual pixels of the second area are within a predefined deviation from the average value.

Optionally, the uniformity of values is less than the predefined uniformity threshold value if a predefined number of individual pixels of the second area are outside the predefined deviation from the average value.

Optionally, the retrieved at least one X-ray image includes a first X-ray image corresponding to a high energy signal, a second X-ray image corresponding to a low energy signal and a third X-ray image corresponding to an average of the high and low energy signals.

In some embodiments, the present specification discloses an inspection system configured to enable an operator to perform visual layer separation of an image being displayed in a screen in data communication with the inspection system, the inspection system being in data communication with a processor that executes a plurality of programmatic instructions or code for: retrieving at least one X-ray generated image from a memory in data communication with the inspection system, wherein the image comprises a first area of pixels representative of a target object obscured by a clutter object and a second area of pixels representative of the clutter object, and wherein the second area is different from the first area; receiving a selection of the pixels representative of the first area; receiving a selection of the pixels representative of the second area; determining if the selected second area meets a predefined quality threshold; if the selected second area meets the predefined quality threshold, generating a modified at least one X-ray image; and if the selected second area does not meet the predefined quality threshold, prompting the operator, via the screen, to select a different second area of pixels representative of the clutter object.

Optionally, the modified at least one X-ray image is generated by: calculating a first average intensity corresponding to the first area; calculating a second average intensity corresponding to the second area; and stripping away the second average intensity from the first average intensity.

Optionally, the inspection system further comprises normalizing data indicative of the modified at least one X-ray image to account for beam hardening.

Optionally, the determining if the selected second area meets the predefined quality threshold is achieved by assessing a uniformity of values associated with the pixels of the second area and if the uniformity of values equals or exceeds a predefined uniformity threshold value, determining that the selected second area meets the predefined quality threshold.

Optionally, the assessing of the uniformity of values is determined by calculating an average value representative of the pixels of the second area and determining if individual pixels of the second area are within a predefined deviation from the average value.

Optionally, the uniformity of values equals or exceeds the predefined uniformity threshold value if a predefined number of individual pixels of the second area are within the predefined deviation from the average value.

Optionally, the determining if the selection meets a predefined quality threshold is achieved by assessing a uniformity of values associated with the pixels of the second area and if the uniformity of values is less than a predefined uniformity threshold value, determining that the selected second area does not meet the predefined quality threshold.

Optionally, the assessing of the uniformity of values is determined by calculating an average value representative of the pixels of the second area and determining if individual pixels of the second area are within a predefined deviation from the average value.

Optionally, the uniformity of values is less than the predefined uniformity threshold value if a predefined number of individual pixels of the second area are outside the predefined deviation from the average value.

Optionally, the retrieved at least one X-ray image includes a first X-ray image corresponding to a high energy signal, a second X-ray image corresponding to a low energy signal and a third X-ray image corresponding to an average of the high and low energy signals.

In some embodiments, the present specification discloses a method for an accurate image visual layer separation, comprises 1) retrieving an X-ray generated image from a pre-stored data, wherein the image consists of one or more areas having multiple material layers in which at least one first layer has material defining a target object and at least one second layer has material that clutters or obscures the target objects, 2) applying an algorithmic stripping of the at least one second layer by identifying each layer using a signal or pixel uniformity test and/or by identifying another area in the image, the characteristics of which define the at least one second layer, and using that data to programmatically remove that corresponding data from the one or more areas to reveal the target object, 3) determining a material type of the at least one second layer and using data representative of that material type to correct for intensities of the target object in the at least one first layer, assuming the material has certain characteristics, and 4) determining the material, size, shape, position, and/or X-ray attenuation of the target objects by referencing a data source, such as a lookup-table.

In some embodiments, the present specification discloses an X-ray inspection system is configured for an accurate image visual layer separation, the X-ray inspection system includes a processor and a memory, wherein the processor executes a plurality of programmatic instructions or code for 1) retrieving an X-ray generated image from a pre-stored data, wherein the image consists of one or more areas having multiple material layers in which at least one first layer has material defining a target object and at least one second layer has material that clutters or obscures the target objects, 2) applying an algorithmic stripping of the at least one second layer by identifying each layer using a signal or pixel uniformity test and/or by identifying another area in the image, the characteristics of which define the at least one second layer, and using that data to programmatically remove that corresponding data from the one or more areas to reveal the target object, 3) determining a material type of the at least one second layer and using data representative of that material type to correct for intensities of the target object in the at least one first layer, assuming the material has certain characteristics, and 4) determining the material, size, shape, position, and/or X-ray attenuation of the target objects by referencing a data source, such as a lookup-table.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 3C provides a perspective view of an exemplary self-contained inspection system of the present invention;

FIG. 5A illustrates an X-ray scan image showing a plurality of scanned items and a selection area including obscuring clutter and obscured or concealed items, in accordance with some embodiments of the present specification;

FIG. 5B illustrates a modified X-ray scan image of FIG. 5A, in accordance with some embodiments of the present specification;

FIG. 5C illustrates a further modified X-ray scan image of FIG. 5A, in accordance with some embodiments of the present specification;

DETAILED DESCRIPTION

Figure 1A:
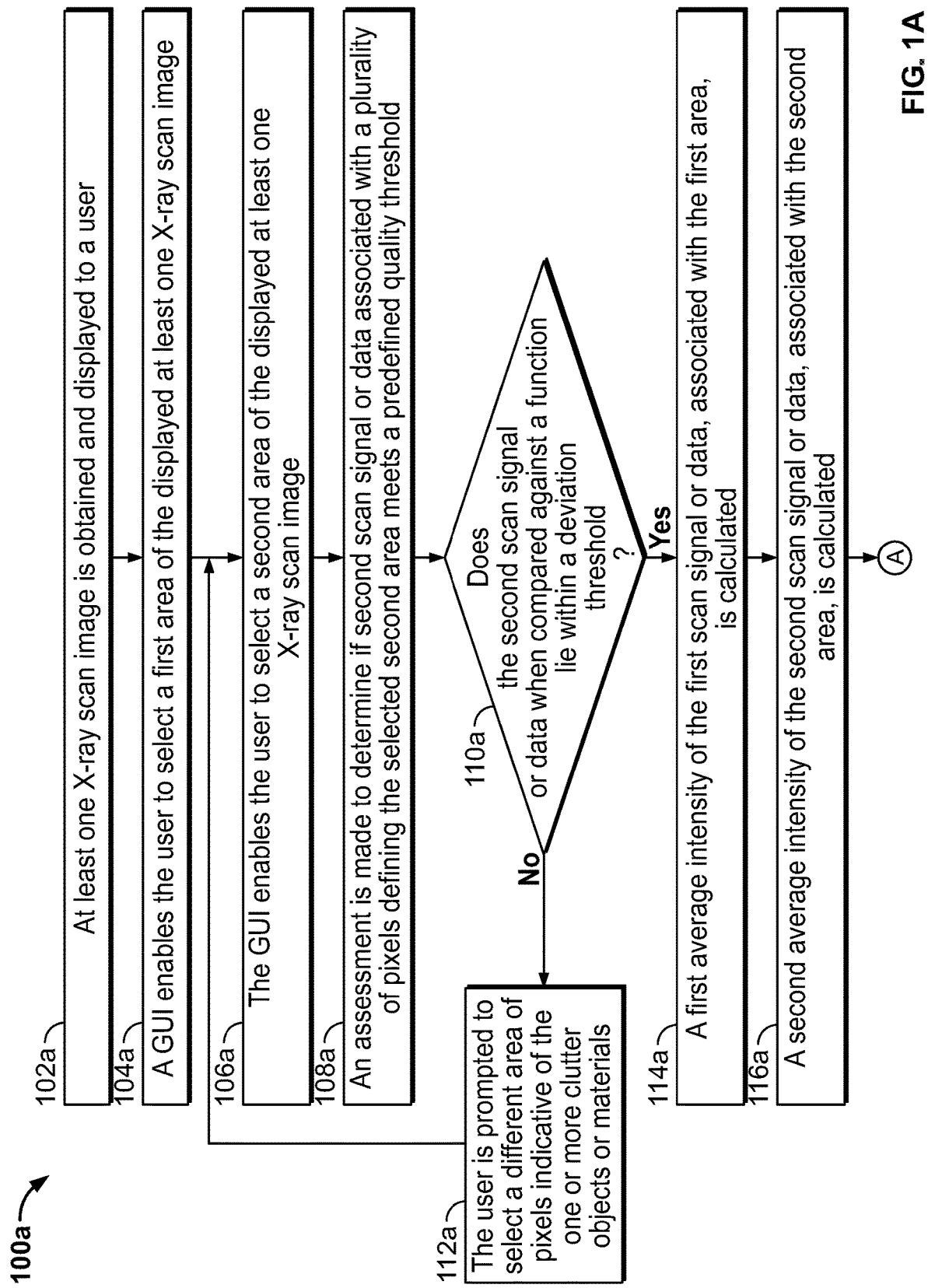
FIG. 1A is a flow chart of a plurality of exemplary steps of a method of separating visual layers in an X-ray scan image, in accordance with some embodiments of the present specification.

The present specification discloses processing of an X-ray image, displayed on a screen, to obtain a clear view of target objects hidden or obscured behind clutter objects by selecting a first area of the X-ray image corresponding to a target object confounded behind a clutter object, selecting a second area of the X-ray image corresponding to the clutter object. In some embodiments, a single area is selected that corresponds to a region where the target object is hidden or obscured behind the clutter object. The present specification further discloses modifying pixel data indicative of the first area (using pixel data indicative of the second area) to generate a modified X-ray image. The modified X-ray image is also corrected for beam-hardening to correctly identify and reveal the target object. Also disclosed is a feedback feature for an incorrect or correct selection while selecting the second area in the X-ray image to view the target object. Embodiments of the disclosed X-ray systems and methods apply to any radiation penetrating form of inspection.

As used herein, the term "target object" refers to an object that should be identified by the X-ray scanning process and typically represents a threat or an illegal object, such as explosive material, nuclear material, knives, guns, weaponry, illegal drugs, hazardous material, batteries, currency, agricultural products, suspicious goods, and incorrectly or mis-declared goods, among other illegal objects. As used herein, the term "clutter object" refers to a non-target object which serves to obscure, confound, or otherwise prevent the identification of a target object.

In accordance with some aspects, the present specification accounts for the "hardening" of an X-ray beam as it passes through increasingly thick clutter materials. This impacts the ability to remove contribution from clutter in a simple, additive way, as after significant attenuation, the cluttered material attenuates a far different distribution of X-ray energies within the spectrum. This is particularly problematic given the case of mixed obstruction-attempting to identify different materials behind different clutter materials, where the linear attenuation coefficients of each material is significantly different. Without this correction there would result significant misclassification of materials, particularly thinner, low attenuation materials that constitute a large portion of threat/contraband items of interest (such as, drugs, explosives) in cargo and vehicle inspection.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the singular forms "a," "an," and "the" designate both the singular and the plural, unless expressly stated to designate the singular only.

In various embodiments, the system includes at least one processor capable of processing programmatic instructions, has a memory capable of storing programmatic instructions, and employs software comprised of a plurality of programmatic instructions for performing the processes described herein. In various embodiments, a computing device may be employed to receive and process data signals and image data and may include an input/output controller, at least one communication interface and a system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across a network of multiple computer systems and architectures. In some embodiments, execution of a plurality of sequences of programmatic instructions or code, which are stored in one or more non-volatile memories, enable or cause the CPU of the computing device to perform or enable various functions, processes and algorithms, such as, for example, performing image reconstruction for display on a screen. In alternate embodiments, hard-wired circuitry may be used in place of, or in combination with, software instructions for implementation of the processes of systems and methods described in this application. Thus, the systems and methods described are not limited to any specific combination of hardware and software.

Figure 1A:
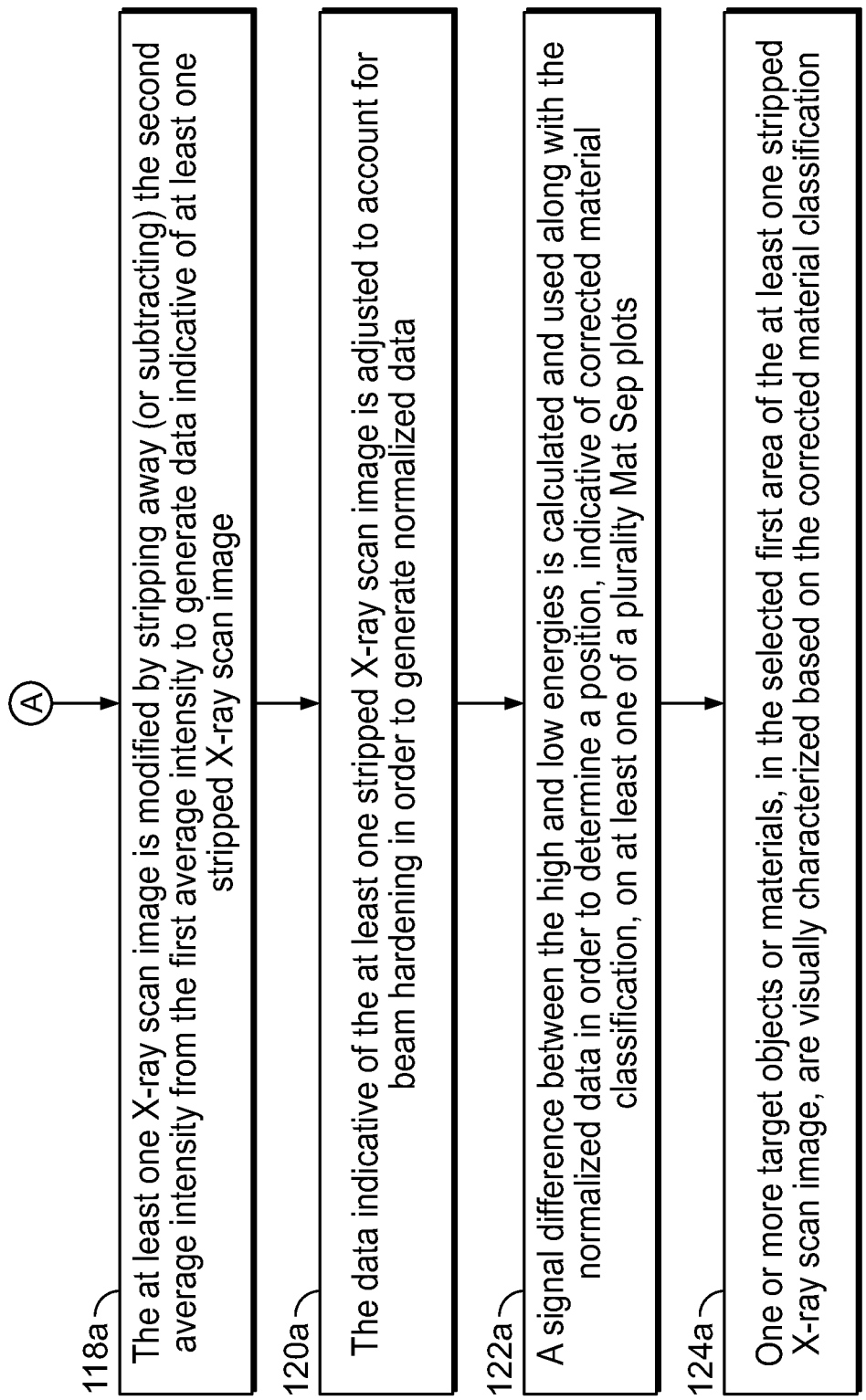

FIG. 1 is a flow chart of a plurality of exemplary steps of a method 100a of separating visual layers in an X-ray scan image, in accordance with some embodiments of the present specification. In various embodiments, a memory unit of an X-ray inspection system (such as, for example, the inspection systems of FIGS. 3A, 3B and 3C) stores a plurality of programmatic instructions or code which when executed by a processor or control unit (in data communication with the memory unit) of the X-ray inspection system causes the method 100a to be implemented.

At step 102a, at least one X-ray scan image is obtained, by the processor or control unit, from the memory unit of the X-ray inspection system and displayed to a user. In some embodiments, more than one X-ray scan images are obtained—for example, a first X-ray scan image corresponding to a high energy signal that is in a range of 6 to 9 MeV, a second X-ray scan image corresponding to a low energy signal that is in a range of 2 to 5 MeV, and a third X-ray scan image corresponding to an average of the high and low energy signals for enhanced signal-to-noise ratio.

In embodiments, the processor or control unit is configured to generate a graphical user interface (GUI) that presents the at least one X-ray scan image on a display associated with the X-ray inspection system.

At step 104a, the GUI enables the user to select a first area of the displayed at least one X-ray scan image. In some embodiments, the first area corresponds to a region in which one or more target objects or materials are obscured or confounded by one or more clutter objects or materials.

Figure 2B:
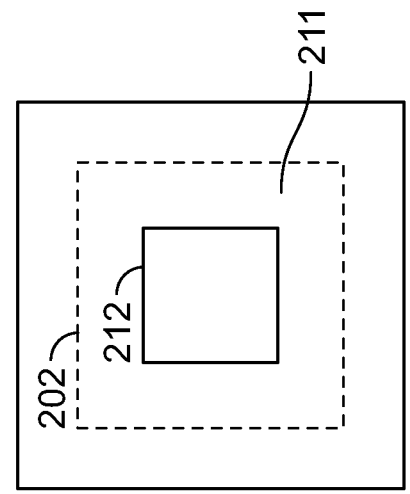
FIG. 2B illustrates a first selection area including overlapping target layer and obscuring layer, in accordance with some embodiments of the present specification.
Figure 2A:
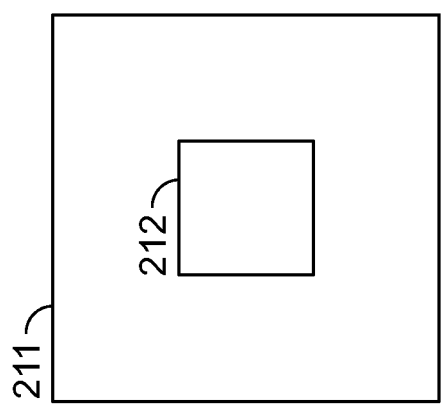
FIG. 2A illustrates a schematic of a target layer obscured behind an obscuring layer in an exemplary image.

FIG. 2A illustrates a plastic layer, object or material 212 (that is, a target object or material) obscured behind a steel layer, object or material 211 (clutter object or material). FIG. 2B illustrates a region 202 that is selected wherein an overlap between target object 212 and clutter object 211 is present.

It should be appreciated that each area of an X-ray image is representative of the accumulated material attenuating the X-rays impinging in that area and that the corresponding image data and visual representation of that image data reflects the combination of materials through which the X-ray passed. Also, image data representative of materials in deeper layers of the region being scanned is affected by beam hardening (that is, absorption of certain energies by the materials in top layers).

Figure 2C:
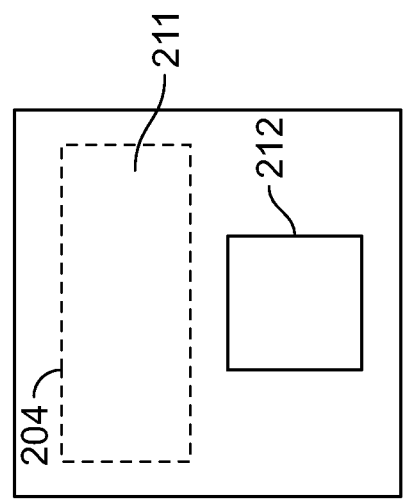
FIG. 2C illustrates a second selection area including a portion of an obscuring layer, in accordance with some embodiments of the present specification.

At step 106a, the GUI enables the user to select a second area of the displayed at least one X-ray scan image. In some embodiments, the second area corresponds to a region associated with only the clutter objects or materials. FIG. 2C illustrates a second selection area 204 chosen by the operator wherein the second selection area 204 includes only a portion of the obscuring steel (clutter object) layer 211.

In some embodiments, the material of obscuring layer 211 is identified by identifying all the pixels which satisfy a uniformity function and by calculating an attenuation value representative of those collective set of pixels. The identification of all the pixels is constrained by the operator input. Therefore, in one embodiment, if an inadequate area 204 is selected, which does not satisfy the "uniformity" requirement, then a request is made to select a different second area or region.

Selecting areas 202 and 204 requires that sufficient regions are available in the image that allows for a rectangle to be drawn over sufficient pixels to pass the uniformity test. If, in an embodiment, the region of target layer leaves little region of the obscuring layer available for selection, or the region of the obscuring layer is distributed around the region of target layer, then selection of a simple rectangular (or any other shape) region may not be possible. In this scenario, an operator is provided with an option to select a single region shown in FIG. 2B. If the method of combining FIGS. 2B and 2C is used where that of FIG. 2B alone is preferred, the operator may be prompted with a message display on the screen. The message can be an error message that reports the specifics of the non-uniformity result. Examples of the message may include text such as: "you have selected a region with insufficient pixels", "you have selected a region with too high a variation in the signal intensity" or "you have selected a region with more than one material". Alternatively, a visual indication including a color or an image is displayed to warn the operator. In some embodiments, regions for clutter subtraction are automatically highlighted in the image, instead of requiring the operator to select the region(s) manually. The highlighted region(s) can be suggestive and may require the operator to confirm the suggestion using an option through the GUI. The operator may select to use the option of selecting a single region. An exemplary process using the method of calculating from a singular area selection is further described with reference to FIG. 1B.

Referring again to FIG. 1A, the intensity signal corresponding to the selected regions (202 and 204) is plotted in a histogram (see FIG. 3). Irrespective of the different material types (steel clutter/organic target, or organic clutter/steel target) the intensity peak of selected area of the obscuring layer (204) is always seen to the right of an intensity peak that corresponds to selected area containing both the obscuring layer and the target layer (202), in the histogram plot. The appearance of the intensity peak of selected area of the obscuring layer (204) on the right is since the obscuring layer reduces the X-ray signal intensity by the time the signal reaches the target layer that is hidden by the obscuring layer. The peak on right (308) shown in histogram of FIG. 4 corresponds to lower attenuation and so represents the obscuring layer of the clutter material.

Figure 4:
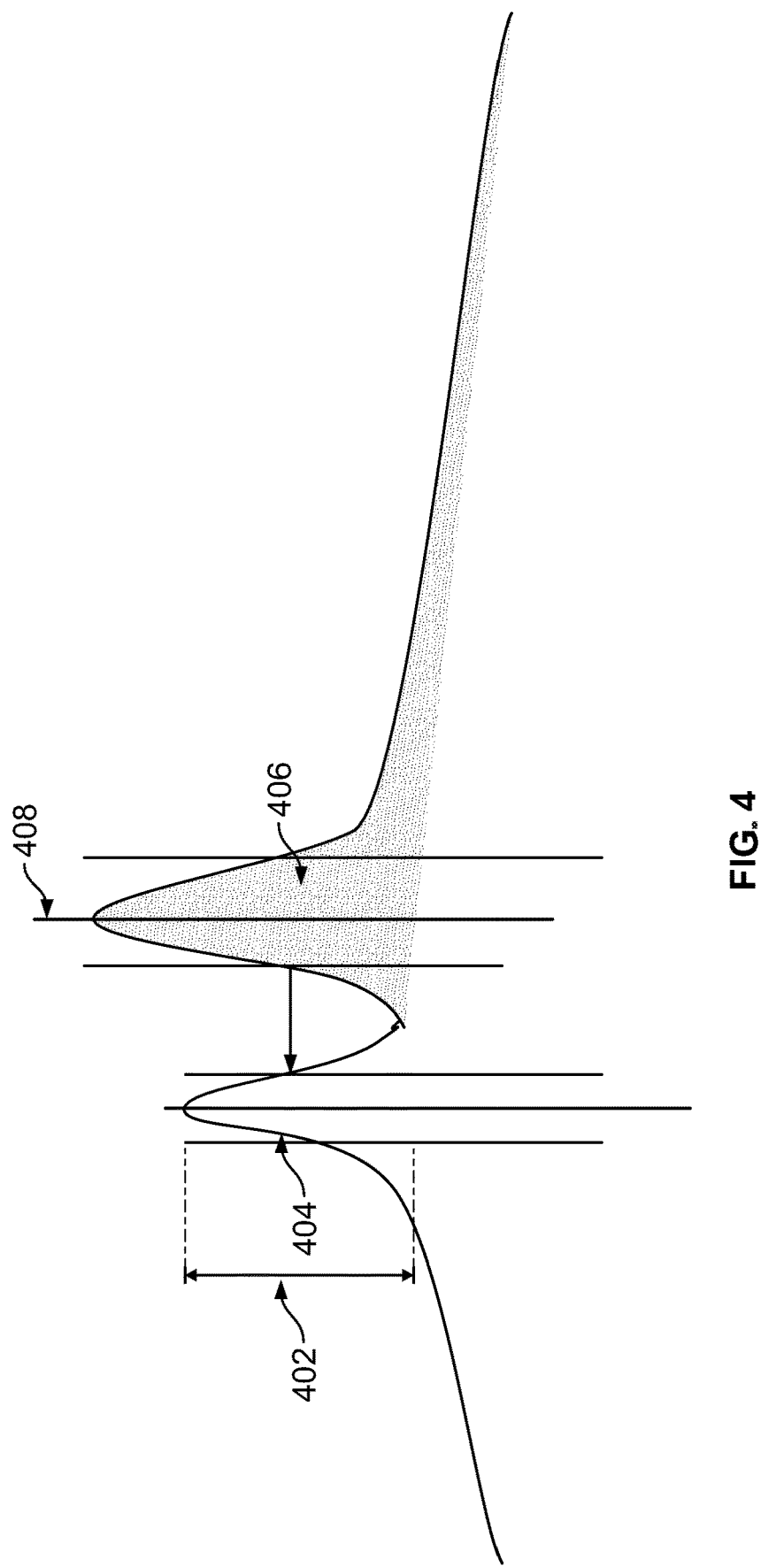
FIG. 4 shows an exemplary set of features for assessing a uniformity of values.

FIG. 4 illustrates an exemplary histogram analysis using distribution of intensities among the pixels of a selected regions (202 and 204). The graph represents intensity value on the x-axis and numbers of pixels on the y-axis. The features may comprise at least one of a peak height 402 representative of a maximum value of a given signal, a full width at half maximum or standard deviation 404 which is representative of a width of a signal measured at half the peak value, a total intensity 406 of another signal representative of a value of an entire area under a signal curve, and/or the location 408 of the peak heights relative to other peak heights. In the example, peak height 408 highlights the intensity value shared by the most pixels. More pixels have this intensity value than any other in the selected region. Therefore, peak height is the value that most pixels have for each region.

At step 108*a*, an assessment is made to determine if second scan signal or data associated with a plurality of pixels defining the selected second area (204) meets or satisfies a predefined function or quality threshold. In some embodiments, determining if the second area meets or satisfies the predefined function or quality threshold is achieved by assessing a uniformity of values associated with the plurality of pixels and if the uniformity of values equals or exceeds a predefined uniformity threshold value, determining that the selected second area meets or satisfies the predefined function or quality threshold.

In some embodiments, the assessing of the uniformity of values is determined by calculating a function of a plurality of features, such as signal shape, distribution and intensity, of the second scan signal or data associated with the plurality of pixels defining the selected second area. In some embodiments, the function is an average/mean value or a standard deviation of at least one of the plurality of features. Examples of parameters that enable assessment of uniformity further include: peak heights, peak areas, standard deviations, and relative peak locations of the signal. In some embodiments, an upper and lower bounded threshold value is required for each of the above parameters, for each of the material 211 and 212. In an example using the peak area, most imaging systems color regions that have a minimum of 64 pixels-so the "Peak Area" lower threshold value may well be 64.

In embodiments, other parameters can also be used, of which some parameters may be scanning system-specific, where in some systems knowledge of dose output, detector configuration, among other specifications, is also required. In one embodiment, maximum value of an acceptable standard deviation for a high-energy high-dose system is approximately 256 pixels. This may not be true for a lower dose system where there is a larger noise contribution towards the image—in this case 256 may be too low. Similarly, threshold values are determined for peak location.

Peak separation refers to a parameter that allows for the two regions (202 and 204) to be distinctively identified. If the peaks of the signals from the two regions (202 and 204) are too close, then measurement of the standard deviation of each peak independently is difficult, thus will limit the accuracy of the results that can be achieved.

Standard deviation is calculated in the following steps: first, the peak is identified and then the mean signal intensity is determined. The determined value should correspond to the average value shown below. Second, the minimum and maximum locations of the peak are identified. In FIG. 4, the minimum location corresponds to peak height 402 and the maximum location corresponds to peak height 408. Here, it is essential that the peak separation value is above a threshold, so that an accurate result can be achieved. Third, the total number of pixels within each bound area and the total intensity within that bound area are determined.

Average intensity within a bound area is calculated as follows:

$$\frac{\sum_{i=1}^{n} x_i}{n}$$

Where, x=intensity of one pixel within the bound area, and
n=total number of pixels in the bound area.

Finally, square of the deviations of each pixel within the minimum and maximum bounds is summed and divided by the total number of pixels in that area. This calculation is shown below:

$$\sqrt{\frac{\sum_{i=1}^{n}(x_i - \text{mean})^2}{n-1}}$$

At step 110*a*, the second scan signal or data associated with each pixel in the selected second area (204) is compared against the function to determine if it is within a predefined deviation threshold from the function. If a predefined number or percentages of pixels are outside the deviation threshold, the selected second area 204 is determined to be not sufficiently uniform. Therefore, at step 112*a* the user is prompted to select a different second area of pixels from the obscuring layer indicative of the one or more clutter objects or materials. However, if the predefined number or percentages of pixels are within the deviation threshold the selected second area is determined to be sufficiently uniform and the flow moves to step 114*a*.

In some embodiments, the operator is provided with an option to select an overlapping region 202 and use that region to perform the calculations in accordance with the present specification. The alternative option is provided if the selected second area 204 is determined to be not sufficiently uniform. The process that follows using this option is further described with reference to FIG. 1B. The process of offering the option to the operator is described above with reference to step 106*a*.

At step 114*a*, a first average intensity of the first scan signal or data, associated with the first area 202, is calculated. At step 116*a*, a second average intensity of the second scan signal or data, associated with the second area 204, is calculated. The calculations are performed as shown above.

At step 118*a*, the at least one X-ray scan image is modified by applying a function, such as stripping away or subtracting, the second average intensity from the first average intensity to generate data indicative of at least one modified or corrected X-ray scan image. In some embodiments, the stripping or subtracting involves dividing the first average intensity by the second average intensity—that is applying a correction to the first area. The calculation may be shown as below:

(Target Intensity+Clutter Intensity)/Clutter Intensity

The above calculation is re-normalized to the full scale 16 bit range (65536).

In some embodiments, first data is generated by dividing first and second average intensities of first and second areas associated with the first X-ray scan image (corresponding to the high energy signal) and second data is generated by dividing first and second average intensities of first and second areas associated with the second X-ray scan image corresponding to the low energy signal.

At step 120a, the data indicative of the at least one modified or corrected X-ray scan image is further adjusted to account for beam hardening to generate normalized data. Specifically, as X-rays pass through an area, lower energies are absorbed, leaving only higher energies to pass through the deeper layers. This skews the absorbed intensities for deeper layers which must therefore be adjusted.

At step 122a, a signal difference between the high and low energies, of an X-ray source of the X-ray inspection system, is calculated and used along with the normalized data in order to determine a position, indicative of corrected material classification, on at least one of a plurality material separation (Mat Sep) plots that are pre-stored in the memory unit and include calibration data.

At step 124a, the one or more target objects or materials, in the selected first area 202 of the at least one stripped X-ray scan image, are visually characterized based on the corrected material classification. For example, in some embodiments, different types of materials of the one or more target objects or materials are displayed in different colors for ease of identification by the user.

Figure 1B:
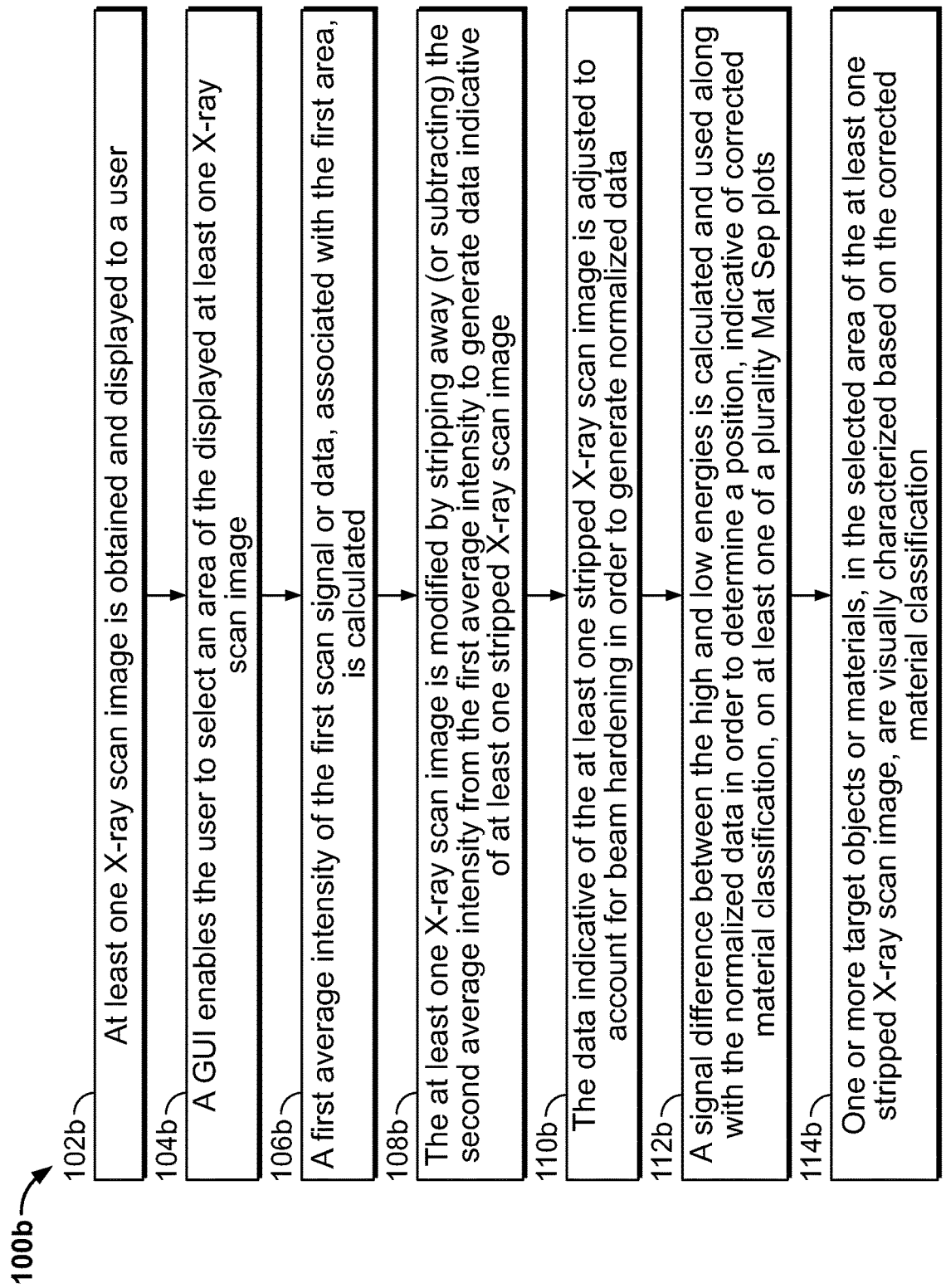
FIG. 1B is a flow chart of exemplary steps of another method of separating visual layers in an X-ray scan image, in accordance with some embodiments of the present specification.

FIG. 1B is a flow chart of a plurality of exemplary steps of another method 100b of separating visual layers in an X-ray scan image, in accordance with some embodiments of the present specification. In various embodiments, a memory unit of an X-ray inspection system (such as, for example, the inspection systems of FIGS. 3A, 3B and 3C) stores a plurality of programmatic instructions or code which when executed by a processor or control unit (in data communication with the memory unit) of the X-ray inspection system causes the method 100a to be implemented.

At step 102b, at least one X-ray scan image is obtained, by the processor or control unit, from the memory unit of the X-ray inspection system and displayed to a user. In some embodiments, more than one X-ray scan images are obtained—for example, a first X-ray scan image corresponding to a high energy signal that is in a range of 6 to 9 MeV, a second X-ray scan image corresponding to a low energy signal that is in a range of 2 to 5 MeV, and a third X-ray scan image corresponding to an average of the high and low energy signals for enhanced signal-to-noise ratio.

In embodiments, the processor or control unit is configured to generate a graphical user interface (GUI) that presents the at least one X-ray scan image on a display associated with the X-ray inspection system.

At step 104b, the GUI enables the user to select an area of the displayed at least one X-ray scan image. In some embodiments, the selected area corresponds to a region in which one or more target objects or materials (target layer) are obscured or confounded by one or more clutter objects or materials (obscuring layer).

Referring again to FIG. 2A, a plastic layer, object or material 212 (that is, a target object or material) is shown to be obscured behind a steel layer, object or material 211 (clutter object or material). FIG. 2B illustrates a selection area 202 chosen by the operator wherein the selection area 202 includes both the target layer 212 and the obscuring steel layer 211.

Each area of an X-ray image is representative of the accumulated material attenuating the X-rays impinging in that area and that the corresponding image data and visual representation of that image data reflects the combination of materials through which the X-ray passed. Also, image data representative of materials in deeper layers of the region being scanned is affected by beam hardening (that is, absorption of certain energies by the materials in top layers).

In some embodiments, the material of obscuring layer 211 is identified in FIG. 1A by identifying all the pixels which satisfy a uniformity function and by calculating an attenuation value representative of those collective set of pixels. The identification of all the pixels is constrained by the user input. Therefore, in one embodiment, if an inadequate area 204 is selected, which satisfies the "uniformity" requirement, then the request is made to reselect a new area or region.

Ability to select area 202 is optionally provided to an operator if, in an embodiment, the region of target layer leaves little region of obscuring layer available for selection, or the region of the obscuring layer is distributed around the region of target layer, then selection of a simple rectangular (or any other shape) region (as per FIG. 2C) may not be possible. The operator is provided with an option to select a region using the method shown in FIG. 2B. If the method of FIG. 2C is used where that of FIG. 2B alone is preferred, the operator may be prompted with a message display on the screen. The message can be an error message that reports the specifics of the non-uniformity result. Examples of the message may include text such as: "you have selected a region with insufficient pixels", "you have selected a region with too high a variation in the signal intensity" or "you have selected a region with more than one material". Alternatively, an audio or a visual indication including a color or an image is displayed to warn the operator. In some embodiments, regions for clutter subtraction are automatically highlighted in the image, instead of requiring the operator to select the region(s) manually. The highlighted region(s) can be suggestive and may require the operator to confirm the suggestion using an option through the GUI.

In embodiments, a region 202 including both target and obscuring layers is selected. The selection results in an image with a signal containing at least two peaks. In the intensity signal corresponding to the image, irrespective of the different material types (steel clutter/organic target, or organic clutter/steel target) the intensity peak of obscuring layer appears to the right of the intensity peak that corresponds to both the obscuring and target layers. This is because the obscuring layer reduces the X-ray signal intensity by the time the signal reaches the target layer that is hidden by the obscuring material. The peak on right (408) shown in histogram of FIG. 4 corresponds to lower attenuation and so represents the obscuring layer.

At step 106b, average intensities of the scan signal or data, associated with the selected area, is calculated. The calculations are performed as shown above with reference to FIG. 1A. Referring again to FIG. 4, more than one average intensity value is calculated, corresponding to at least one obscuring layer (peak 408) and at least one target layer (peak 402).

At step 108b, the at least one X-ray scan image is modified by applying a function, such as stripping away or subtracting, the second average intensity from the first average intensity to generate data indicative of at least one modified or corrected X-ray scan image. In some embodiments, the stripping or subtracting involves dividing the first average intensity by the second average intensity—that is applying a correction to the intensity measurements corresponding to target object. The calculation may be shown as below:

(Target Intensity+Clutter Intensity)/Clutter Intensity

The above calculation is re-normalized to the full scale 16 bit range (65536).

In some embodiments, first data is generated by dividing first and second average intensities with the first X-ray scan image corresponding to the high energy signal, and second data is generated by dividing first and second average intensities associated with the second X-ray scan image corresponding to the low energy signal.

At step 110b, the data indicative of the at least one modified or corrected X-ray scan image is further adjusted to account for beam hardening to generate normalized data. Specifically, as X-rays pass through an area, lower energies are absorbed, leaving only higher energies to pass through the deeper layers. This skews the absorbed intensities for deeper layers which must therefore be adjusted.

At step 112b, a signal difference between the high and low energies, of an X-ray source of the X-ray inspection system, is calculated and used along with the normalized data in order to determine a position, indicative of corrected material classification, on at least one of a plurality of material separation (Mat Sep) plots that are pre-stored in the memory unit and include calibration data.

At step 114b, the one or more target objects or materials, in the selected rea of the at least one stripped X-ray scan image, are visually characterized based on the corrected material classification. For example, in some embodiments, different types of materials of the one or more target objects or materials are displayed in different colors for ease of identification by the user.

FIG. 5A illustrates an X-ray scan image 500a showing bottled water 517, cans of petrol 513, bags of salt 516, a lead brick 514 and three blocks of plastic 515 concealed behind 100 mm of steel (in the foreground). An area 519a, which includes the 100 mm of steel, is positioned above (or in front of) the three blocks of plastic 515, which are concealed behind the 100 mm of steel. If the 100 mm of steel is stripped away, the plastic blocks 515 are revealed.

FIG. 5B illustrates a modified X-ray scan image 500b where visual data corresponding to the 100 mm of steel is stripped away to reveal the underlying blocks of plastic 515. Additionally, the user selects an area 519b, associated with the cargo container walls (typically thin steel) of the image 500b. FIG. 5C illustrates a further modified X-ray scan image 500c where visual data corresponding to the selected portion 519b (of FIG. 5B) is stripped away to better reveal the cans of petrol 513 and pallet of wood 518 (of FIG. 5B).

Figure 6A:
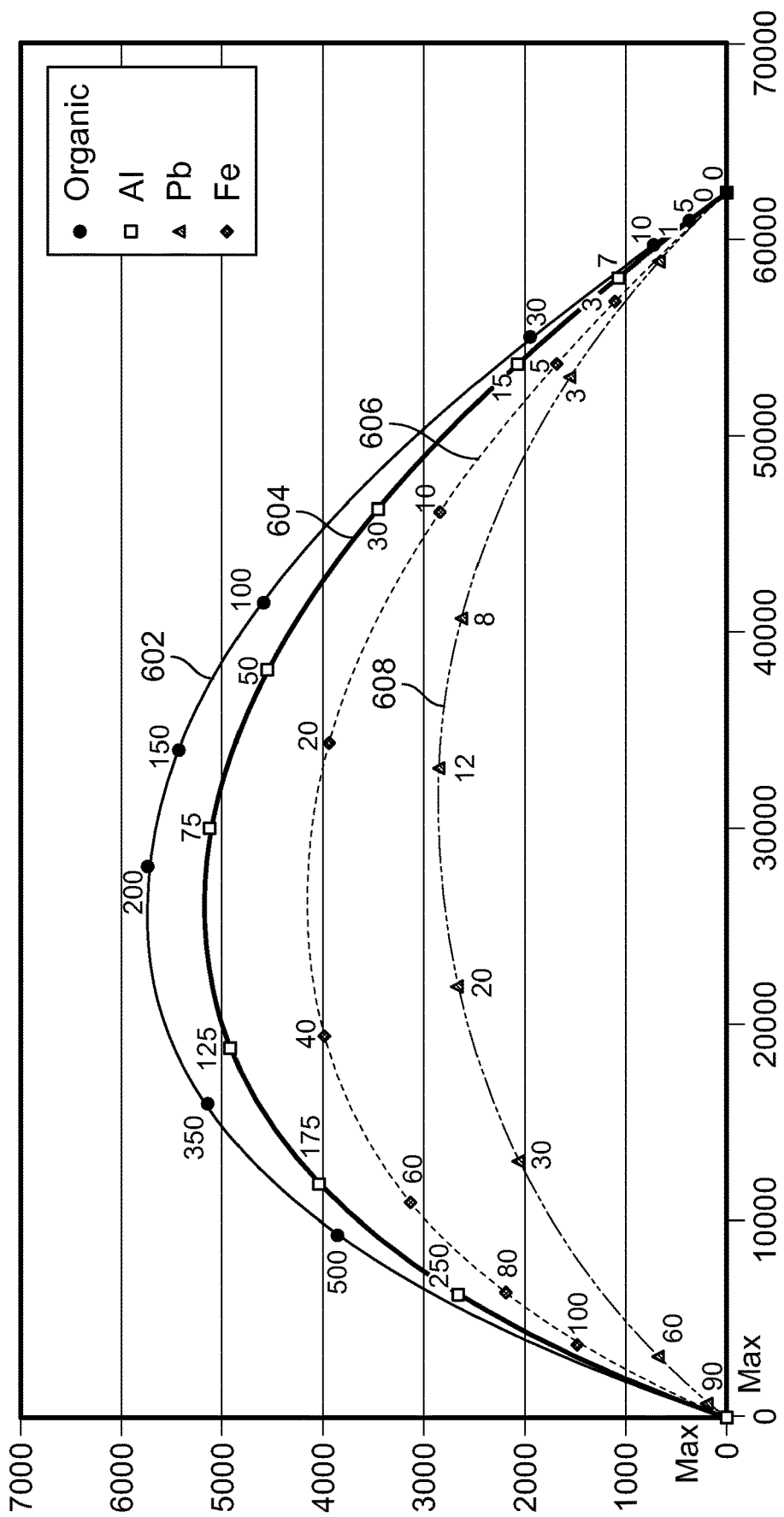
FIG. 6A illustrates a plurality of material separation/discrimination curves obtained without any of the materials being confounded by an obscuring object.
Figure 6B:
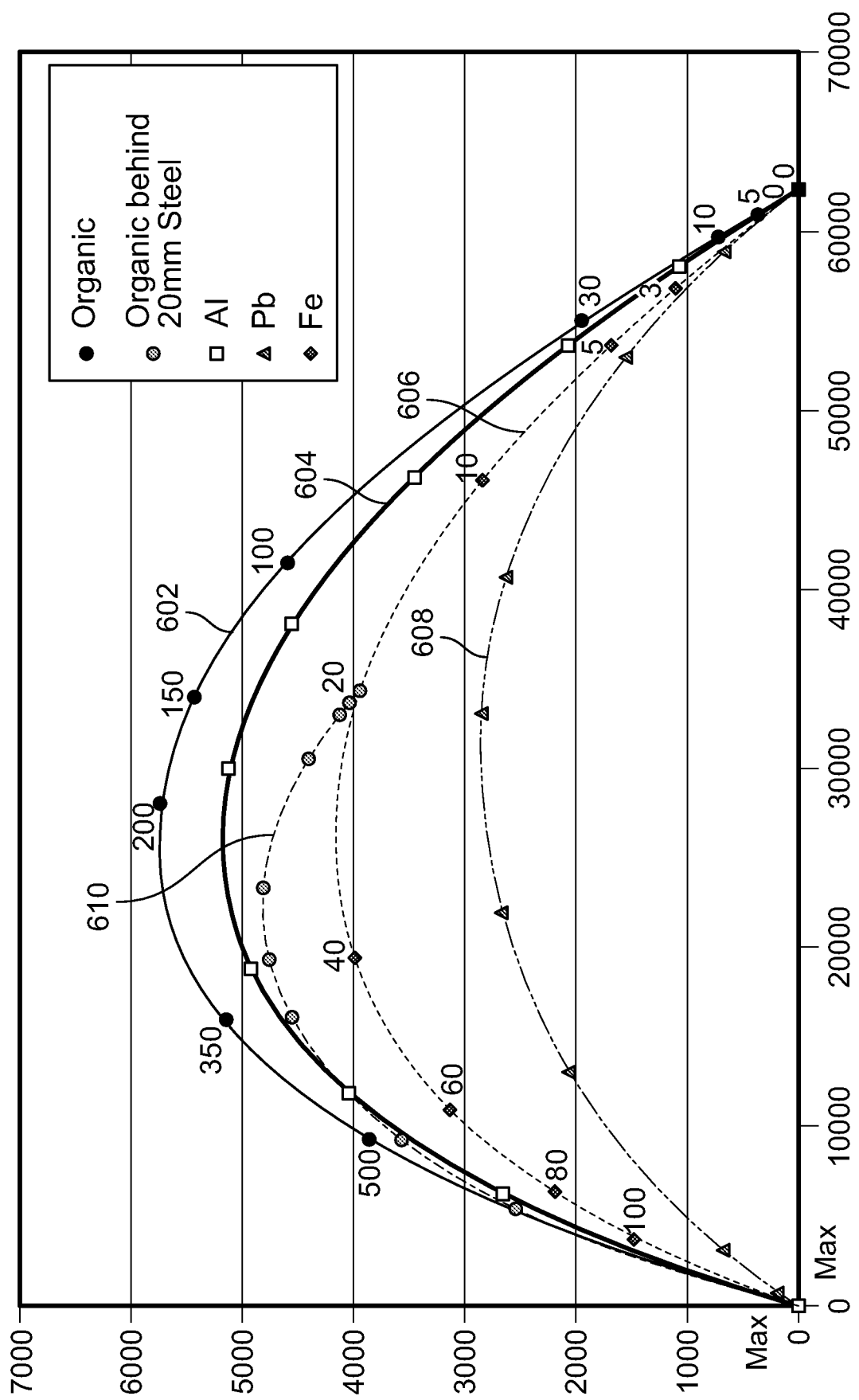
FIG. 6B illustrates the plurality of material separation/discrimination curves of FIG. 6A along with an additional material separation curve for a target object obscured behind 20 mm of an obscuring object.
Figure 6C:
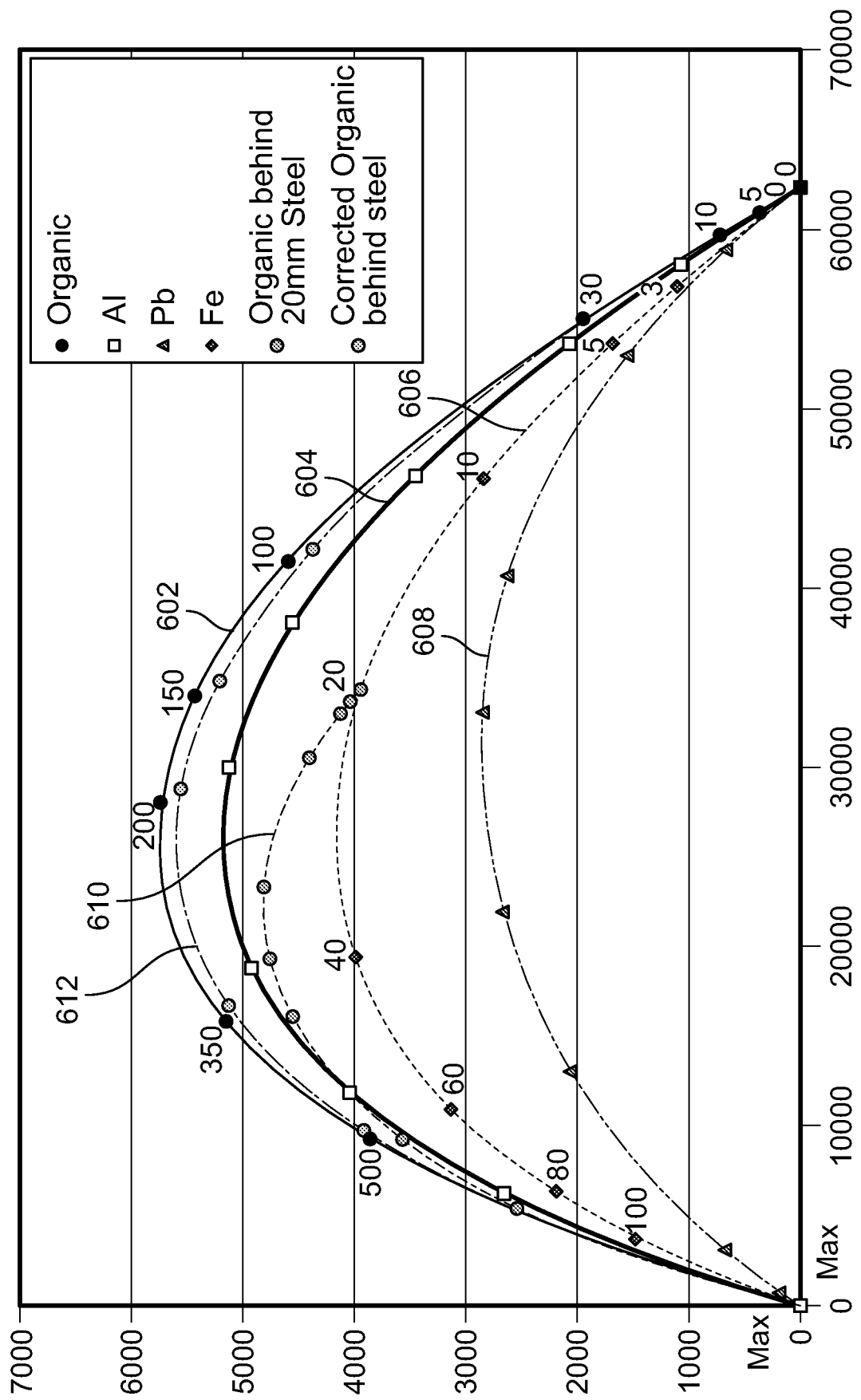
FIG. 6C illustrates the plurality of material separation/discrimination curves of FIG. 6B along with an intensity corrected curve for the target object behind 20 mm of an obscuring object.
Figure 8:
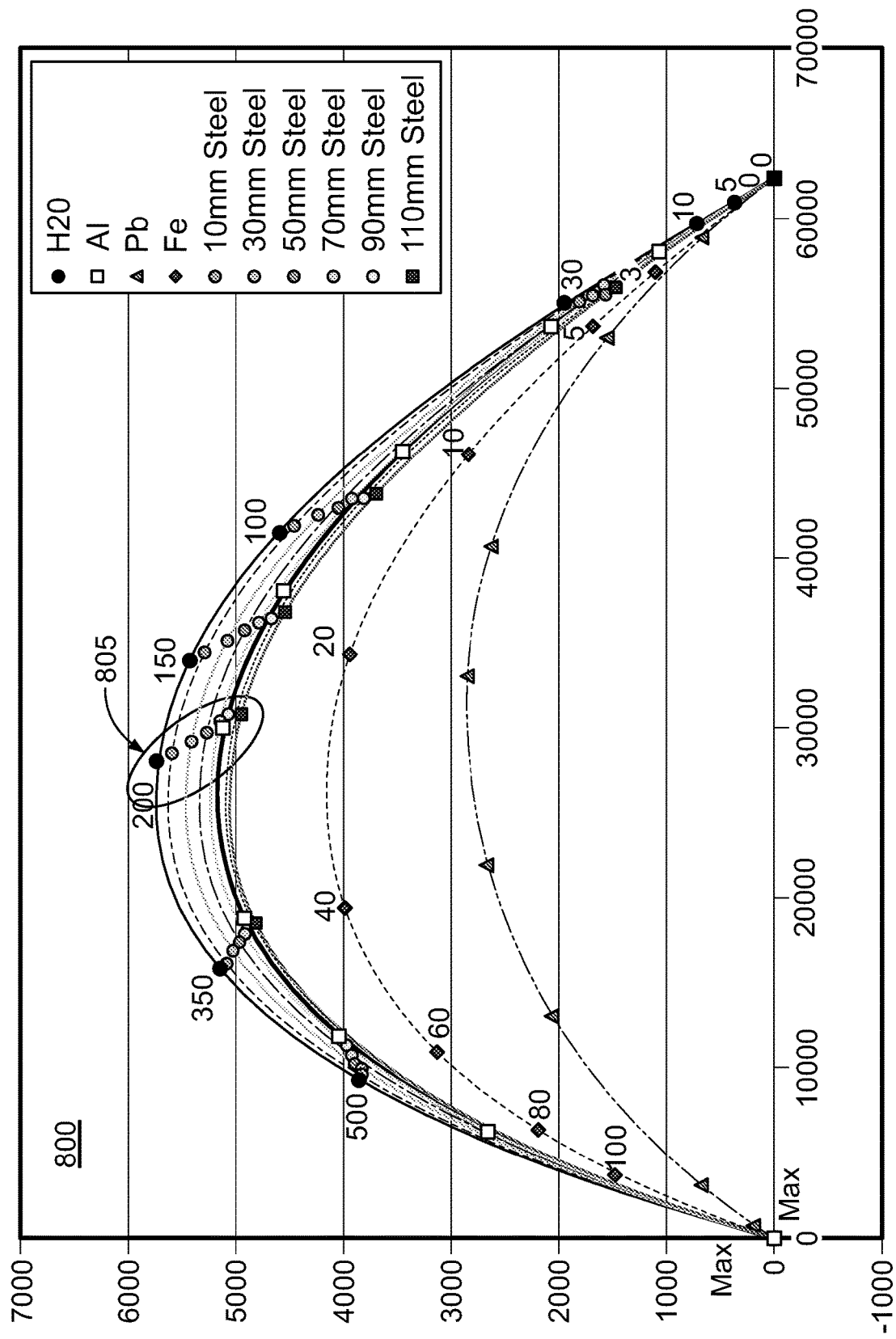
FIG. 8 illustrates a plurality of intensity corrected material separation/discrimination curves obtained with an organic material (such as, plastic) being obscured behind increasing thickness of obscuring material (steel)

FIG. 6A illustrates a plurality of material separation/discrimination curves obtained without any of the materials being confounded by clutter materials/objects. The figure shows a first material separation curve 602 for an organic material, a second material separation curve 604 for Aluminum, a third material separation curve 606 for Iron and a fourth material separation curve 608 for Lead. FIG. 6B illustrates the plurality of material separation/discrimination curves of FIG. 6A along with a fifth material separation curve 610 for the organic material being obscured behind 20 mm of steel (clutter material/object). FIG. 6C illustrates the plurality of material separation and/or discrimination curves of FIG. 6B along with an intensity corrected sixth curve 612 for the organic material behind 20 mm of steel. For low clutter thickness, a simple intensity correction may give correct target material classification (and therefore colorization in an X-ray scan image), but a high or low thickness may result in an incorrect Z-eff and density calculation. The effect of clutter thickness on the intensity correction is illustrated in FIG. 8, which shows a stepwise increase from low to "high" clutter thicknesses and the impact on the location of the corrected organic curve.

However, the present specification recognizes that as the thickness of an obscuring clutter material increases, a simple intensity correction tends to generate a misclassification of a target material as the intensity corrected points (for a combination of the target material obscured by clutter material) now fall along a line of another material.

Figure 7A:
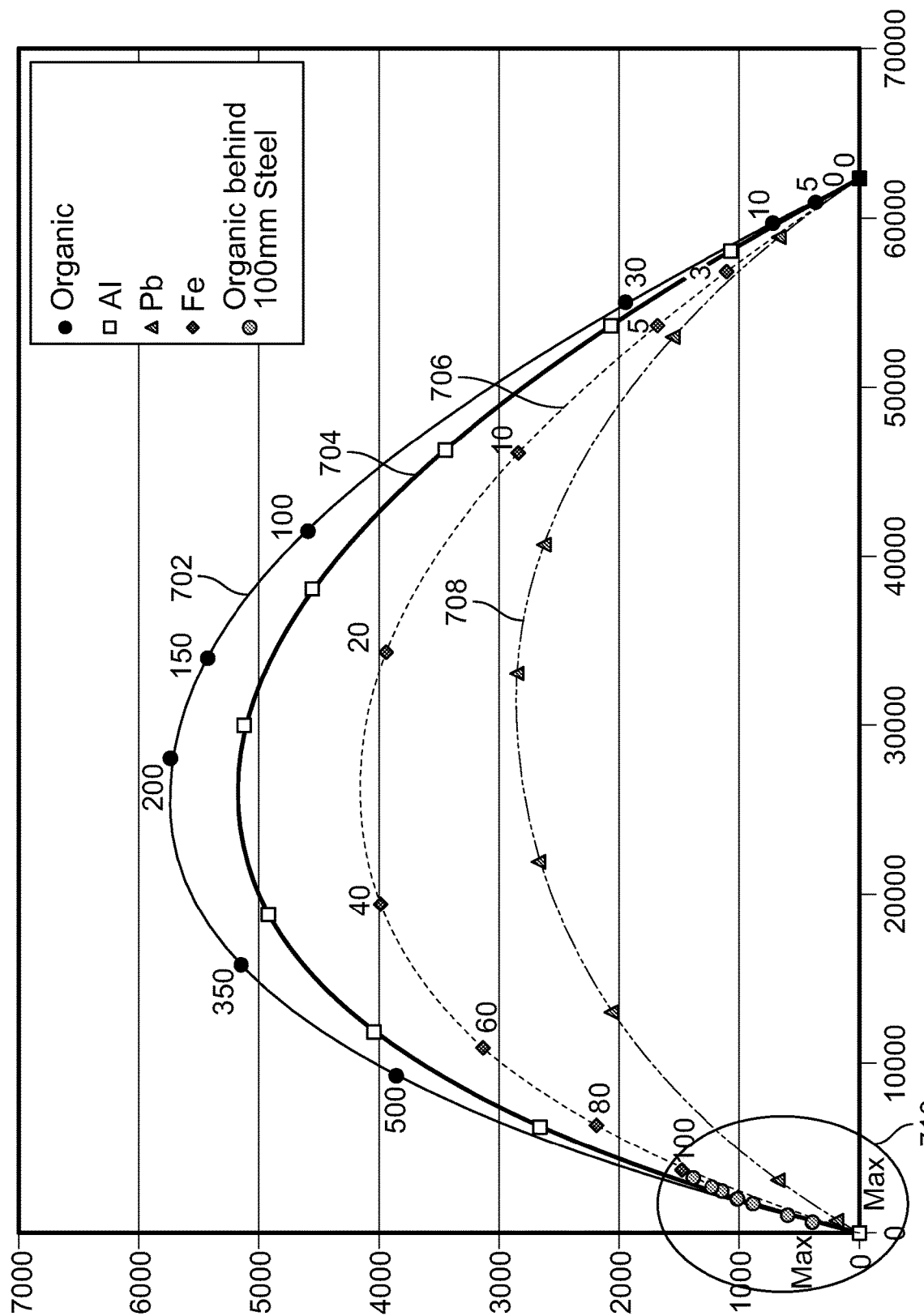
FIG. 7A illustrates a plurality of material separation/discrimination curves obtained without any of the target objects being confounded by obscuring objects along with an additional material separation curve for target object being obscured behind 100 mm of an obscuring object.
Figure 7B:
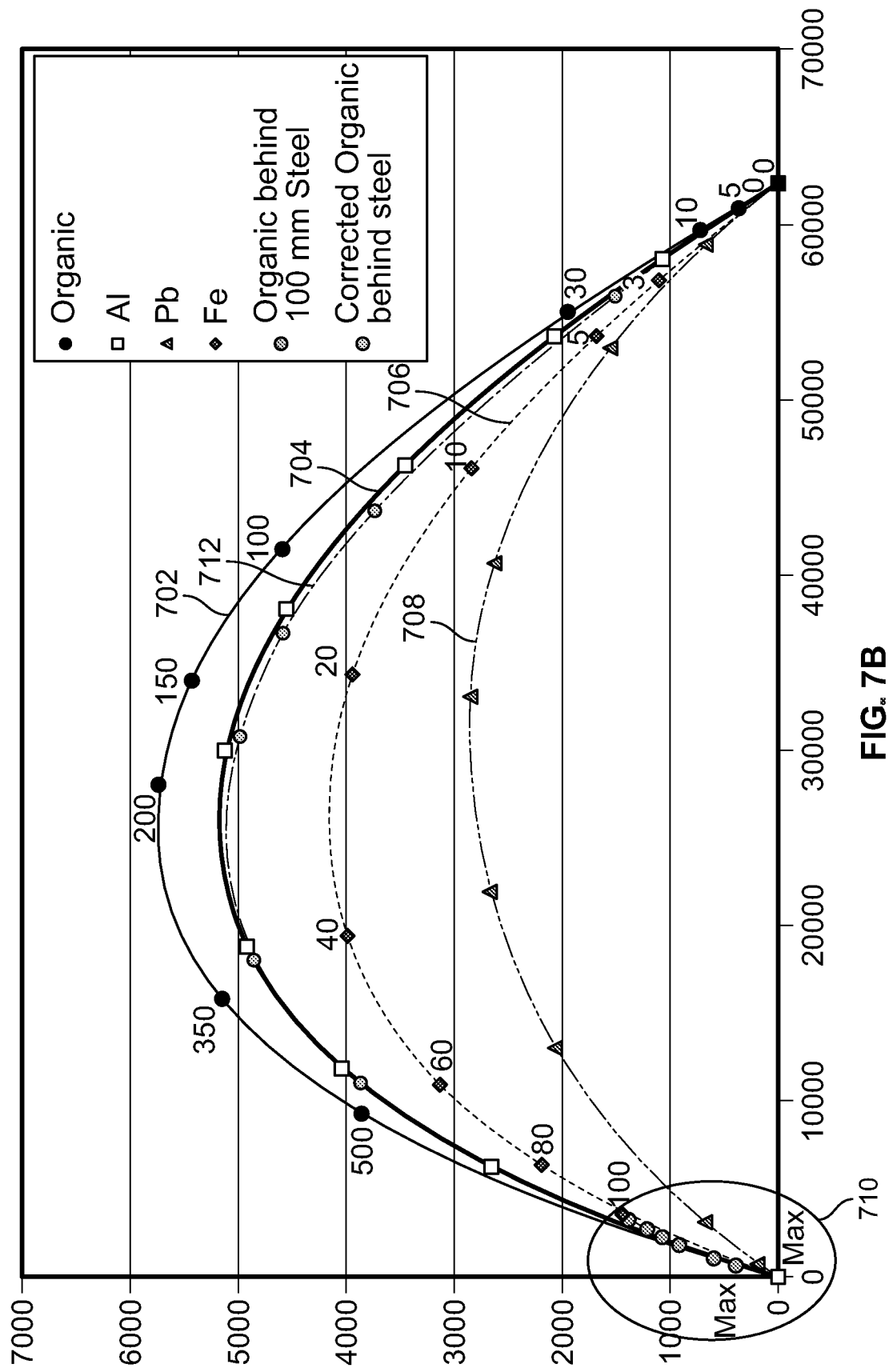
FIG. 7B illustrates the plurality of material separation/discrimination curves of FIG. 7A along with an intensity corrected curve for the organic material behind 100 mm of steel.

FIG. 7A shows a first material separation curve 702 for an organic material, a second material separation curve 704 for Aluminum, a third material separation curve 706 for Iron, a fourth material separation curve 708 for Lead, and a fifth material separation curve 710 for the organic material being obscured behind 100 mm of steel (clutter material/object). The curve 710 is marked by a circle since the signal has been highly attenuated. FIG. 7B additionally shows a sixth intensity corrected material separation curve 712 for the organic material behind 100 mm of steel. As can be observed from the figure, the intensity corrected sixth curve 712 substantially overlaps with the second curve 704 for Aluminum. In other words, the intensity signal for organic material has been corrected to inaccurately look substantially like that of Aluminum.

The curve 712 is fitted to the data points that have had a simple intensity correction applied, where the intensity/signal that the steel attenuates is added back to the measured intensity/signal from the steel/organic combination. However, the correction does not return the data points to their original location assuming the absence of an obscuring material. This is a consequence of beam hardening. Essentially, the energy dependence of the attenuation of X-rays through materials results in the obscured organic material attenuating less when behind steel as the X-ray spectrum has an average higher energy once it passes through the steel. To address this, a significant correction is needed to account for beam hardening.

FIG. 8 illustrates a plurality of intensity corrected material separation and/or discrimination curves obtained with an organic material (such as, plastic) being obscured behind increasing thickness of clutter material (steel). FIG. 8 shows a stepwise increase from low to high clutter thicknesses and the impact on the location of the corrected organic curve. The encircled points 805 correspond to a same thickness of plastic (200 mm) behind increasing thickness of 10 mm, 30 mm, 50 mm, 70 mm, 90 mm and 110 mm of steel (from top towards bottom). The points 805 are the corrected locations on the 2D scatter plot 800, showing that just a simple intensity correction fails with increasing magnitude for increasing steel thickness, to reproduce the original data for the obscured plastic. The corrected intensity curve corresponding to for 50 mm of steel is closer to the unobstructed aluminum curve (green) than the unobstructed organic curve (orange). Thus, the presence of 50 mm thick steel clutter incorrectly renders the colorization more green than orange. The intensity correction also depends significantly on X-ray energy output and detector configuration. The figure further shows that steel clutter thickness of less than 40 mm can be considered to provide acceptable results of intensity correction, for the given X-ray energy output and detector configuration. The intensity corrected value is also inaccurate for thinner plastics (seen to the right on the chart). At 90 mm of steel clutter thickness, the corrected plastic looks substantially like Aluminum, and will therefore be color coded erroneously. In accordance with some aspects of the present specification, a beam hardening correction addresses this anomaly.

Figure 9A:
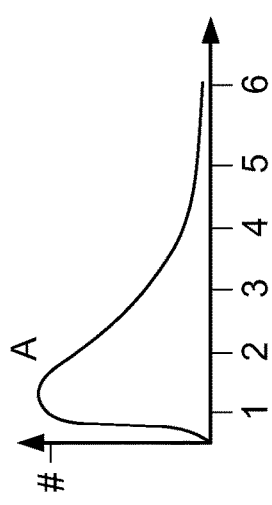
FIG. 9A illustrates a first X-ray energy spectrum of an X-ray beam, generated for cargo interrogation, without any attenuation.
Figure 9B:
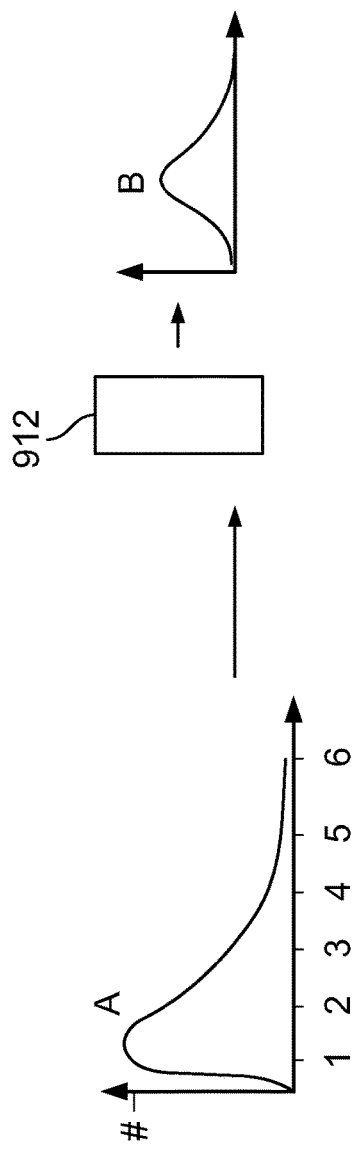
FIG. 9B shows a second X-ray energy spectrum generated when the X-ray beam of FIG. 9A passes through 30 mm of plastic.
Figure 9C:
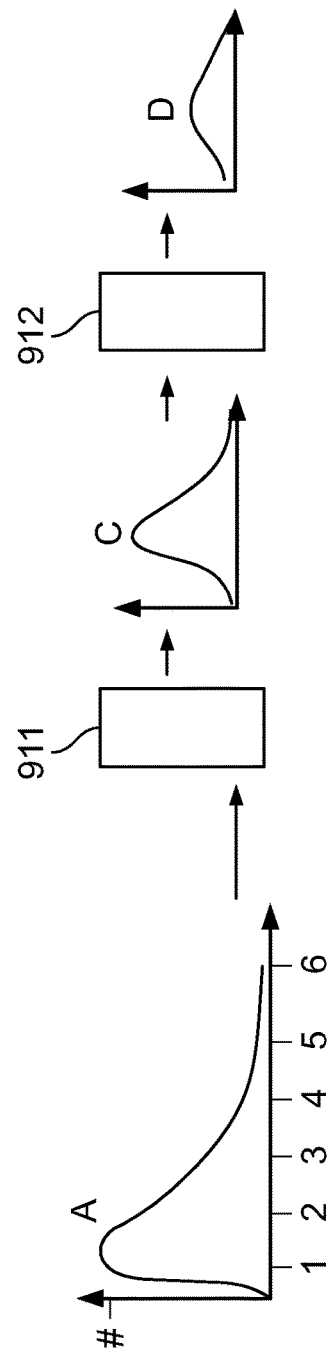
FIG. 9C shows third and fourth X-ray energy spectrums generated when the X-ray beam of FIG. 9A passes through 2 mm of steel and then through 30 mm of plastic.

FIG. 9A illustrates a first X-ray energy spectrum (A), generated for cargo interrogation, with no attenuation. FIG. 9B shows how the X-ray beam of FIG. 9A is attenuated when it passes through 30 mm of plastic 912. The attenuating effect of the 30 mm plastic 912 is illustrated by a second X-ray energy spectrum (B). FIG. 9C shows what happens when the X-ray beam of FIG. 9A passes through 2 mm of steel 911 (resulting in a third X-ray energy spectrum (C)) and then 30 mm of plastic 912 (resulting in a fourth X-ray energy spectrum (D)). Note how the intensity and shape of the fourth X-ray energy spectrum (D) in FIG. 9C is different from the second energy spectrum (B) in FIG. 9B because in FIG. 9C the steel 911 has absorbed the lower energies (causing beam hardening). This results in a suboptimal visual or image representation of the fourth X-ray energy spectrum (D) compared to what it should be (that is, a visual representation of the energy spectrum (B)).

To apply an intensity correction, in order to account for beam hardening, material characteristics for the clutter layers, objects or materials (concealing the target or obscured layers, objects or materials) are determined in accordance with the method 100a/100b of FIG. 1A or FIG. 1B. Specifically, to correct for beam hardening, the method a) uses the material type identified during the image stripping step, b) determines how that material would absorb lower energies to cause a shift/shape change in the attenuation of obscured objects, and c) corrects the shift/shape of the attenuation curve of the obscured object using that determined data.

Exemplary X-Ray Inspection Systems

In some embodiments, the X-ray inspection system is a real-time tomography (RTT) system having a substantially circular locus of source points used to scan a scanning volume. In another embodiment, the X-ray inspection system is a real-time tomography (RTT) system having a substantially rectangular or non-circular locus of source points used to scan a scanning volume. In an embodiment, a plurality of X-ray source points is arranged in a non-circular or substantially rectangular geometry around the scanning volume. Due to the non-circular geometry of the X-ray source points, the RTT system is cost effective, has a smaller footprint and may be operated using regular line voltage to supply power to the high voltage power supply, which is then used to provide power to the X-ray source.

In various embodiments, the X-ray sources emit fan beams which have different beam angles based on the location of the X-ray source points with respect to an imaging volume.

Figure 3A:
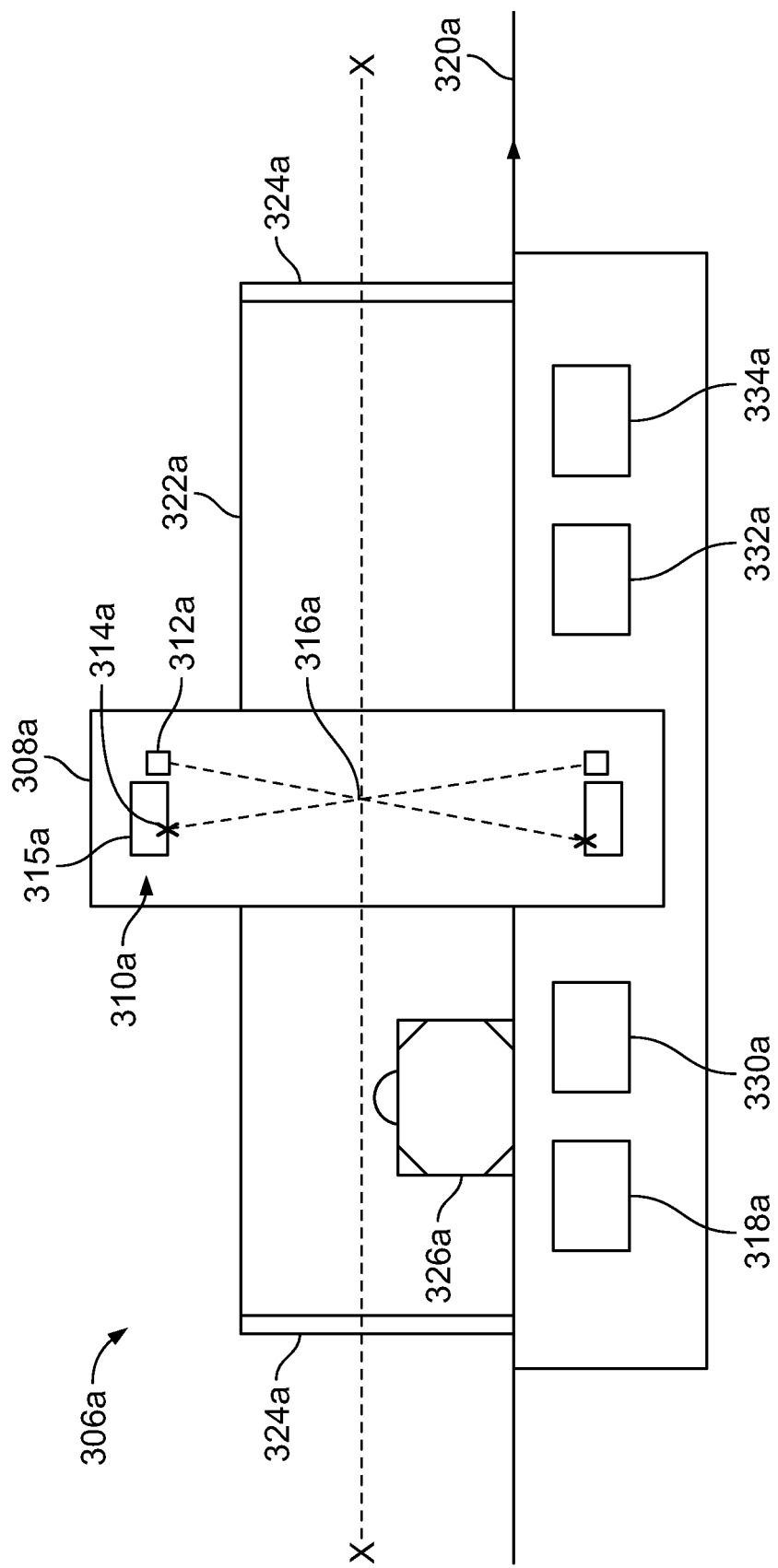
FIG. 3A is a longitudinal schematic view of a real time tomography security scanning system having a circular locus of source points, in accordance with some embodiments.

FIG. 3A illustrates a conventional RTT screening system having a circular locus of source points. Referring to FIG. 3A, a concourse parcel and/or baggage scanning system 306a comprises a scanning unit 308a which includes a multi-focus X-ray source 310a and X-ray detector array 312a. The source 310a comprises a large number of source points 314a positioned in respective, spaced locations on an emitter 315a, and arranged in a full 360-degree circular array about the X-X axis of the system (which is parallel to the conveyor belt 320a). It will be appreciated that curved arrays covering less than the full 360-degree angle can also be used. The source 310a can be controlled to produce X-rays from each of the source points 314a in each of the source units individually whereby X-rays from each source point 314a are directed inwards through the scanning region 316a within the circular source 310a. The source 310a is controlled by a control unit 318a which controls the applied electrical potentials (to the grid structures) and hence controls the emission of X-rays from each of the source points 314a.

The multi-focus X-ray source 310a allows the electronic control circuit 318a to be used to select which of the many individual X-ray source points 314a within the multi-focus X-ray source is active at any moment in time. Hence, by electronically scanning the multi-focus X-ray tube, X-ray source virtual "motion" is created with no actual physical movement of mechanical parts. In this case, the angular velocity of source rotation can be increased to levels that simply cannot be achieved when using conventional rotating X-ray tube assemblies. This rapid rotational scanning translates into an equivalently speeded up data acquisition process and, as a result, fast image reconstruction.

The detector array 312a is also circular and arranged around the axis X-X in a position that is slightly offset in the axial direction from the source 310a. The source 310a is arranged to direct the X-rays it produces through the scanning region 316a towards the detector array 312a on the opposite side of the scanning region. The paths 317a of the X-ray beams therefore pass through the scanning region 316a in a direction that is substantially, or almost, perpendicular to the scanner axis X-X, crossing each other near to the axis. The volume of the scanning region that is scanned and imaged is therefore in the form of a thin slice perpendicular to the scanner axis X-X. The source is scanned so that each source point emits X-rays for a respective period, the emitting periods being arranged in a predetermined order. As each source point 314a emits X-rays, the signals from the detectors 312a, which are dependent on the intensity of the X-rays incident on the detector, are produced, and the intensity data that the signals provide are recorded in a memory. When the source has completed its scan the detector signals can be processed to form an image of the scanned volume.

A conveyor belt 320a moves through the imaging volume, from left to right, as seen in FIG. 3A, parallel to the axis X-X of the scanner. X-ray scatter shields 322a are located around the conveyor belt 320a upstream and downstream of the main X-ray system to prevent operator dose due to scattered X-rays. The X-ray scatter shields 322a include lead rubber strip curtains 324a at the open ends of the system such that the item 326a under inspection is conveyed through one curtain on entering the inspection region and another curtain upon leaving the inspection region. In the integrated system shown, the main electronic control system 318a, a processing system 330a, a power supply 332a and cooling racks 334a are shown mounted underneath the conveyor 320a. The conveyor 320a is arranged to be operated normally with a continuous scanning movement at constant conveyor speed, and typically has a carbon-fiber frame assembly within the imaging volume.

Figure 3B:
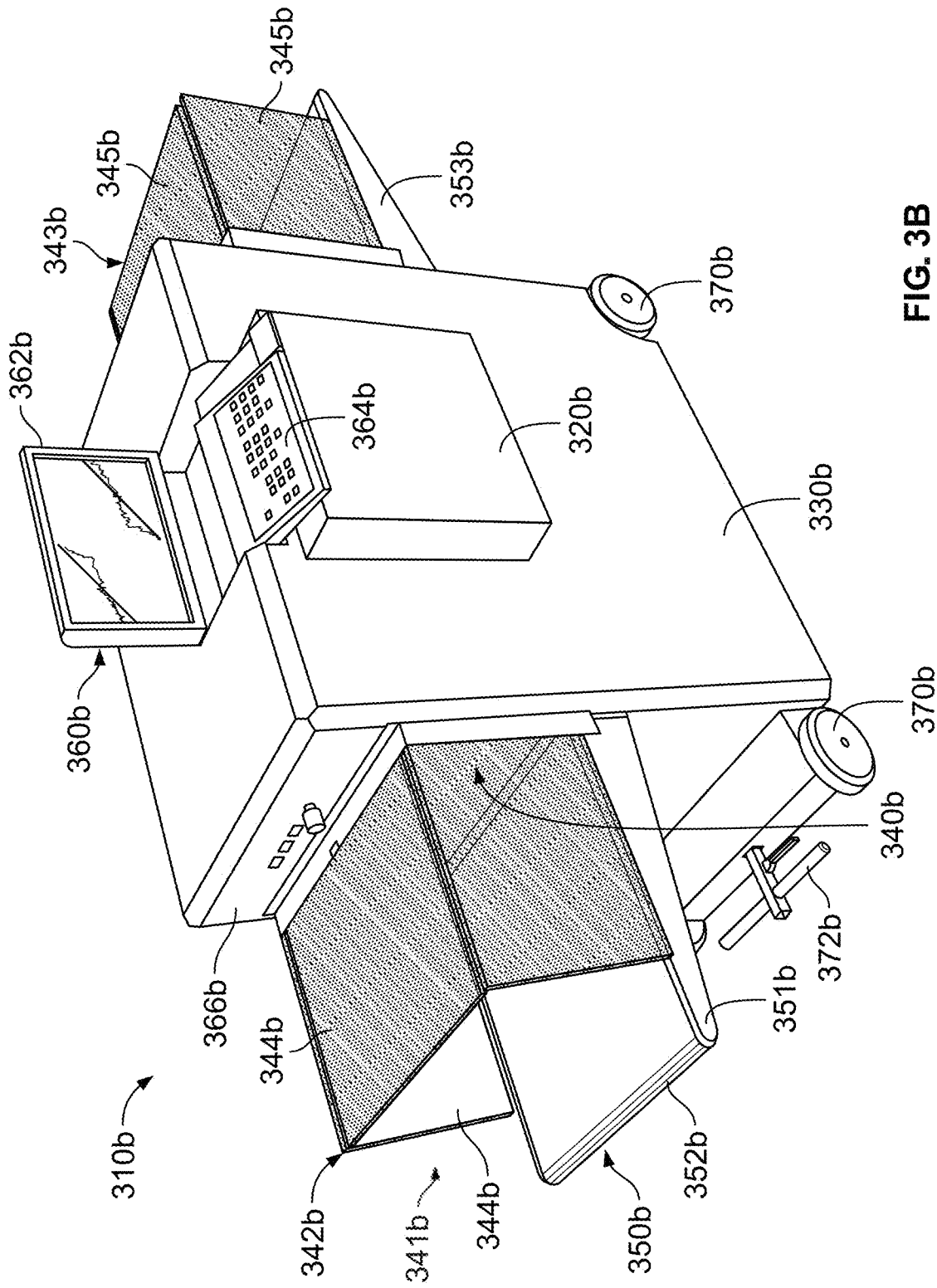
FIG. 3B shows a perspective view of an X-ray security inspection machine, in accordance with some embodiments, in which the machine is deployed for use.

In some embodiments, the X-ray inspection is an X-ray security inspection machine of FIG. 3B. Referring to FIG. 3B, a photodetector array module 320b has been extended to its deployed position and projects from the X-ray machine's housing 330b. The extent of projection of the photodetector array module 320b is typically between 60 mm and 100 mm, but preferably the module extends by approximately 80 mm from the housing.

Contained within the housing 330b are the necessary components for providing an X-ray security inspection, including an X-ray generator, processing and control electronics, power and control cables, a computer processor and memory storing suitable operational software, and X-ray shielding material, as will be understood by a person of ordinary skill in the art.

Above the X-ray generator (not shown) within the housing 330b and below the upper surface of the photodetector array module 320b, the housing defines a tunnel 340b, having a substantially rectangular tunnel opening 341b. Items (such as, for example, parcels and/or baggage) to undergo X-ray inspection in the machine 310b pass through the tunnel 340b for irradiation by X-ray photons. Those photons which are transmitted through the item under inspection are then detected. The tunnel opening 341b has standard dimensions of 640 mm wide by 430 mm high, in this embodiment. The tunnel 340b passes through the housing 330b from an input side 342b to an output side 343b. In order to help define a maximum item size which may be inspected with the machine 310b, a respective plurality of tunnel wall panels 344b, 345b are disposed around the tunnel openings at the input and output sides 342b, 343b. The panels are preferably made of a transparent plastics material, such as polycarbonate, Plexiglas™ or Perspext™, to facilitate observation of items passing into and out of the tunnel 340b.

A conveyor system 350b transports items for inspection from the input side 342b of the tunnel 340b to its output side 343b. In the embodiment shown in FIG. 3B, the conveyor system 350b comprises three separate conveyors: an input conveyor 351b having an associated conveyor belt 352b; an output conveyor 353b having an associated conveyor belt 354b; and an intermediate conveyor (not shown) located within the tunnel 340b and having its own associated conveyor belt (also not shown). Other arrangements of the conveyor system will be readily apparent to a person of ordinary skill in the art.

The X-ray security inspection machine 310b incorporates a control console 360b, comprising a monitor 362b and a keypad/mouse pad 364b, by means of which an operator may control the machine. The control console 360b is stowable, so that it does not contribute to the overall width of the machine 310b, when in its stowed configuration.

Initial activation and subsequent deactivation of the machine 310b are achieved by means of activation control switches 366b, which are accommodated on the housing 330b, preferably not on either lateral sides of the machine, so as not to increase the width profile of the machine. The activation controls 366b may include a key switch to ensure operation only by authorized personnel, or the like.

The X-ray security inspection machine 310b is provided with a set of wheels or castors 370b, on which the machine is supported and by means of which the machine may be moved. The wheels 370b may be standard nylon wheels, conventionally used. However, nylon wheels tend to be relatively hard which makes movement of the machine over certain surfaces, especially uneven surfaces, somewhat difficult. Preferably, the wheels are provided by rubber castors, which are capable of conforming more readily to surface unevenness and reducing the impact on the machine when encountering such surfaces. This specification of wheel also reduces vibration of the machine during transportation. In order to facilitate such movement, a steering and braking handle 372b is provided. The steering and braking handle 372b co-operates with the wheels 370b, at least to provide a braking mechanism if not also to provide a steering mechanism for changing direction of the machine. In the deployed configuration of the machine 310b ready for use, the steering and braking handle 372b is itself stowed away beneath the machine, as shown in FIG. 3B.

In another embodiment, FIG. 3C shows a perspective view of an exemplary self-contained cargo inspection system 300c. The system 300c comprises of an inspection module 315c that, in a preferred embodiment, is in the form of a mobile trailer capable of being towed and transported to its intended operating site with the help of a tug-vehicle 310c. While the system 300c is depicted as a tug vehicle 310c connected to a trailer 320c, one of ordinary skill in the art would appreciate that the vehicular portion of the system and inspection module portion of the system could be integrated into a single mobile structure. An embodiment uses a tug vehicle independent from the inspection module because it adds greater flexibility in how the system is used. In another embodiment, the operator trailer, inspection module 315c, could be a separate vehicle by itself.

The tug-vehicle 310c can serve as a support and carrier structure for at least one source of electromagnetic radiation 311c; hydraulic lift system 312c, such as the Hiab® lifting cranes along with suitable jigs and fixtures or any other lifting mechanism known in the art, to load and unload the at least one source 311c; and a possible radiation shield plate 313c on the back of the driver cabin of tug-vehicle 310c, to protect the driver from first order scatter radiation. The trailer 320c is hitched to the tug-vehicle 310c using a suitable tow or hitch mechanism 305c such as class I through V frame-mounted hitches; fifth wheel and gooseneck hitches mounted on the bed of a pick-up; a simple pintle-hitch; branded hitches such as Reese®, Pull-rite® and Hensley® or any other means known to one of ordinary skill in the art. The class of the hitch indicates the amount of trailer load that it can handle. For example, a class I hitch is rated for a trailer load of about 2000 pounds whereas a class V hitch is rated for loads greater than 10,000 pounds. A typical manually-releasable tow-bar mechanism, disclosed in U.S. Pat. No. 5,727,806 titled "Utility Tow Bar" and assigned to Reese® Products Inc., comprises a coupler assembly including a hitch ball receiving socket and cooperating lock. This facilitates selective connection of a tow-bar to the hitch ball of a trailer hitch receiver carried by a towing vehicle. Alternatively, automatic hitches may also be used for quick coupling and detaching of the tow truck and trailer without manual intervention or attendance.

Referring back to FIG. 3C, the inspection module 315c is custom-built as a mobile trailer can provide support for a plurality of detector arrays 316c and a boom 317c to deploy a power cable to at least one source of radiation during operation. The trailer 320c also houses an operator/analyst cabin including computer and imaging equipment along with associated power supplies, air conditioning and power generating equipment in accordance with the understanding of a person of ordinary skill in the art of X-ray generation. In high energy/high performance system, the trailer containing the detector array 316c and boom 317c may be in a different unit from the trailer housing the inspection module 315c. This will allow the operator to avoid being in a high radiation area and reduce the amount of shielding required for his protection. In preferred embodiment, the trailer 320c may additionally include a plurality of leveling or support feet 318c, 319c to enable stabilized imaging when in stationary use.

In order to use the system 300c, the trailer 320c is towed to the inspection site by the tug-vehicle 310c. After positioning the trailer 320c, the tug-vehicle 310c is detached and moved substantially parallel to the trailer 320c and towards the side carrying the detector system 316c. Here, the radiation source box 311c is shifted out of the tug-vehicle 310c and lowered down to the ground by a hydraulic crane 312c mounted on the tug-vehicle 310c. Thus, the source box 311c is placed laterally opposite to the detector system 316c at a distance that is suitable to allow an OUI (Object Under Inspection) to pass between the source 311c and detector 316c during the scanning process. An OUI could be any type of object, including cars, trucks, vans, mobile pallets with cargo, or any other type of moveable object. During the scanning process, the tug-vehicle 310c, after lowering down the source 311c, is maneuvered to attach to the OUI and tow the OUI through the radiation scan beam. As the OUI is towed through the radiation beam, an X-ray scan image of the OUI is produced on the inspection computers housed within the trailer 320c showing the radiation-induced images of the articles and objects contained within the OUI.

Figure 3D:
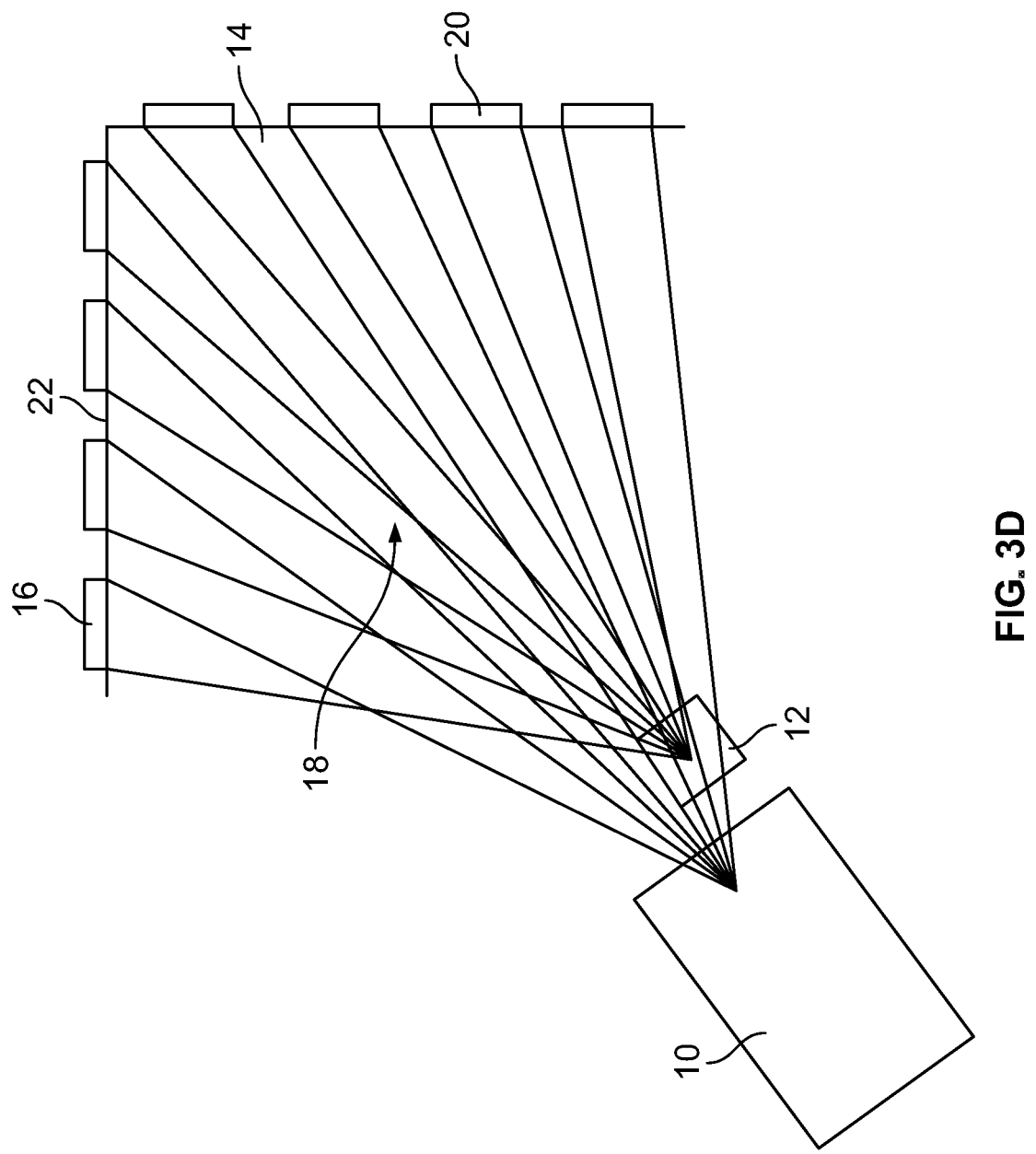
FIG. 3D shows a schematic view of an exemplary X-ray inspection system configured to scan cargo as well as driver cabin portions of a vehicle.

FIG. 3D shows a schematic view of another X-ray inspection system comprising a high energy X-ray source 10 in the form of a linear accelerator, and a low energy X-ray source 12. The low energy X-ray source 12 can be a stationary or rotating anode X-ray tube operating at a high voltage potential of 60 kVp to 450 kVp. Typically, a tube voltage of 160 kVp provides a good balance between radiation dose, image quality, system reliability and system cost. The high energy X-ray source may comprise stationary anode X-ray tubes. The anode is typically operated at or near ground potential and the cathode is typically operated at negative potential. The anode is then cooled with oil, water or other suitable coolant. In low power X-ray tubes of the low energy source 12, the anode is typically operated at high positive potential and the cathode is typically operate at high negative potential and no direct anode cooling is provided.

A detector system 14 comprises a plurality of detectors 16 arranged to detect X-rays from both of the sources 10, 12. The detectors 16 are arranged around a scanning volume 18, in a vertical array 20 which extends down one side of the scanning volume 18, on the opposite side of it to the sources 10, 12, and horizontal array 22 which extends over the top of the scanning volume. The sources 10, 12 are located close to each other and both in the same plane as the detector arrays. Each of the sources 10, 12 is arranged to generate X-rays in a fan beam in the common plane. The dose rate at the output of a low voltage X-ray generator 12 is substantially less than that from a linear accelerator 10. For example, the dose rate from a standard X-ray source operating at 160 kVp with a 1 mA beam current is typically around 0.3 Gy/hr at 1 m. For a scan rate of 0.25 m/s, the dose delivered to a driver at 3 m from the X-ray source can be calculated to be around 10 μSv per scan.

In one practical embodiment of this invention, the scan of a vehicle including a driver's cab and a cargo container is started using the low energy X-ray source 12 only. As the vehicle is driven through the scanning volume, image data is collected as the driver's cab passes through the X-ray beam. Once the driver's cab has passed through the beam, the high energy X-ray linear accelerator 10 is switched on and the low energy X-ray source 12 is turned off. The main cargo load would be inspected with the full intensity high voltage X-ray beam from the linear accelerator 10 to provide a high level of inspection.

The above examples are merely illustrative of the many applications of the system and method of the present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A method for enabling an inspection system operator to perform visual layer separation of an image being displayed on a screen in data communication with the inspection system, comprising:
   generating at least one X-ray image;
   storing the at least one X-ray image in a memory;
   retrieving the at least one X-ray generated image from the memory, wherein the image comprises a first area of pixels representative of a target object obscured by a clutter object and a second area of pixels representative of the clutter object, and wherein the second area is different from the first area;
   receiving a selection of the pixels representative of the first area;
   receiving a selection of the pixels representative of the second area;
   determining if the selected second area satisfies a predefined function by assessing a uniformity of values associated with the pixels of the second area relative to a threshold value;
   when the selected second area does not satisfy the predefined function, visually presenting on the screen an indication that the second area is unsatisfactory and prompting the operator to select a third area of pixels representative of the clutter object, wherein the third area is different than the first area and the second area; and
   removing pixels associated with the third area to generate at least one modified X-ray image that, relative to the at least one X-ray image, does not have pixel data associated with the third area.

2. The method of claim 1, further comprising, when the selected second area does satisfy the predefined function:
   calculating a first average intensity corresponding to the first area;
   calculating a second average intensity corresponding to the second area; and
   modifying the first average intensity using a function of the second average intensity to generate a second modified X-ray image.

3. The method of claim 2, further comprising:
   normalizing data indicative of the second modified X-ray image to account for beam hardening.

4. The method of claim 1, wherein, when the uniformity of values associated with the pixels of the second area relative to the threshold value equals or exceeds the threshold value, determining that the selected second area satisfies the predefined function.

5. The method of claim 1, wherein the assessing of the uniformity of values is determined by calculating an average value representative of the pixels of the second area and determining if individual pixels of the second area are within a predefined deviation from the average value.

6. The method of claim 5, wherein the uniformity of values equals or exceeds the predefined uniformity threshold value if a predefined number of individual pixels of the second area are within the predefined deviation from the average value.

7. The method of claim 1, wherein, when the uniformity of values associated with the pixels of the second area relative to the threshold value is less than the threshold value, determining that the selected second area does not satisfy the predefined function.

8. The method of claim 7, wherein the assessing of the uniformity of values is determined by calculating an average value representative of the pixels of the second area and determining if individual pixels of the second area are within a predefined deviation from the average value.

9. The method of claim 8, wherein the uniformity of values is less than the threshold value if a predefined number of individual pixels of the second area are outside the predefined deviation from the average value.

10. The method of claim 1, wherein the retrieved at least one X-ray image includes a first X-ray image corresponding to a high energy signal, a second X-ray image corresponding to a low energy signal and a third X-ray image corresponding to an average of the high and low energy signals.

11. An inspection system configured to enable an operator to perform visual layer separation of an image being displayed in a screen in data communication with the inspection system, the inspection system being in data communication with a processor that executes a plurality of programmatic instructions or code for:
generating at least one X-ray image;
storing the at least one X-ray image in a memory;
retrieving the at least one X-ray generated image from the memory, wherein the image comprises a first area of pixels representative of a target object obscured by a clutter object and a second area of pixels representative of the clutter object, and wherein the second area is different from the first area;
receiving a selection of the pixels representative of the first area;
receiving a selection of the pixels representative of the second area;
determining if the selected second area satisfies a predefined value by assessing a uniformity of values associated with the pixels of the second area relative to a threshold value;
when the selected second area does not satisfy the predefined value, visually presenting on the screen an indication that the second area is unsatisfactory and prompting the operator to select an area of pixels different from the first area and the second area; and
removing pixels associated with the third area to generate at least one modified X-ray image that, relative to the at least one X-ray image, does not have pixel data associated with the third area.

12. The inspection system of claim 11, wherein, when, the selected second area does satisfy the predefined function, the processor is configured to further execute a plurality of programmatic instructions or code for:
determining a first average intensity corresponding to the first area;
determining a second average intensity corresponding to the second area; and
modifying the first average intensity using a function of the second average intensity to generate a second modified X-ray image.

13. The inspection system of claim 12, wherein the processor is configured to further execute a plurality of programmatic instructions or code for:
normalizing data indicative of the second X-ray image to account for beam hardening.

14. The inspection system of claim 11, wherein, when the uniformity of values associated with the pixels of the second area relative to the threshold value equals or exceeds the predefined value, the processor is configured to further execute a plurality of programmatic instructions or code for determining that the selected second area satisfies the predefined value.

15. The inspection system of claim 14, wherein the assessing of the uniformity of values is determined by calculating an average value representative of the pixels of the second area and determining if individual pixels of the second area are within a predefined deviation from the average value.

16. The inspection system of claim 15, wherein the uniformity of values equals or exceeds the predefined value if a predefined number of individual pixels of the second area are within the predefined deviation from the average value.

17. The inspection system of claim 11, wherein, when the uniformity of values associated with the pixels of the second area relative to the threshold value is less than the predefined value, the processor is configured to further execute a plurality of programmatic instructions or code for determining that the selected second area does not satisfy the predefined value.

18. The inspection system of claim 17, wherein the assessing of the uniformity of values is determined by calculating an average value representative of the pixels of the second area and determining if individual pixels of the second area are within a predefined deviation from the average value.

19. The inspection system of claim 18, wherein the uniformity of values is less than the threshold value if a predefined number of individual pixels of the second area are outside the predefined deviation from the average value.

20. The inspection system of claim 11, wherein the retrieved at least one X-ray image includes a first X-ray image corresponding to a high energy signal, a second X-ray image corresponding to a low energy signal and a third X-ray image corresponding to an average of the high and low energy signals.

21. The method of claim 1, further comprising determining that the selected third area satisfies the predefined function by assessing a uniformity of values associated with the pixels of the third area relative to the threshold value and removing pixel data associated with the third area to generate the at least one modified X-ray image when the selected third area satisfies the predefined function.

22. The inspection system of claim 11, wherein the processor is configured to further execute a plurality of programmatic instructions or code for determining that the selected third area satisfies the predefined function by assessing a uniformity of values associated with the pixels of the third area relative to the threshold value and removing pixel data associated with the third area to generate the at least one modified X-ray image when the selected third area satisfies the predefined function.

* * * * *